2,876,182

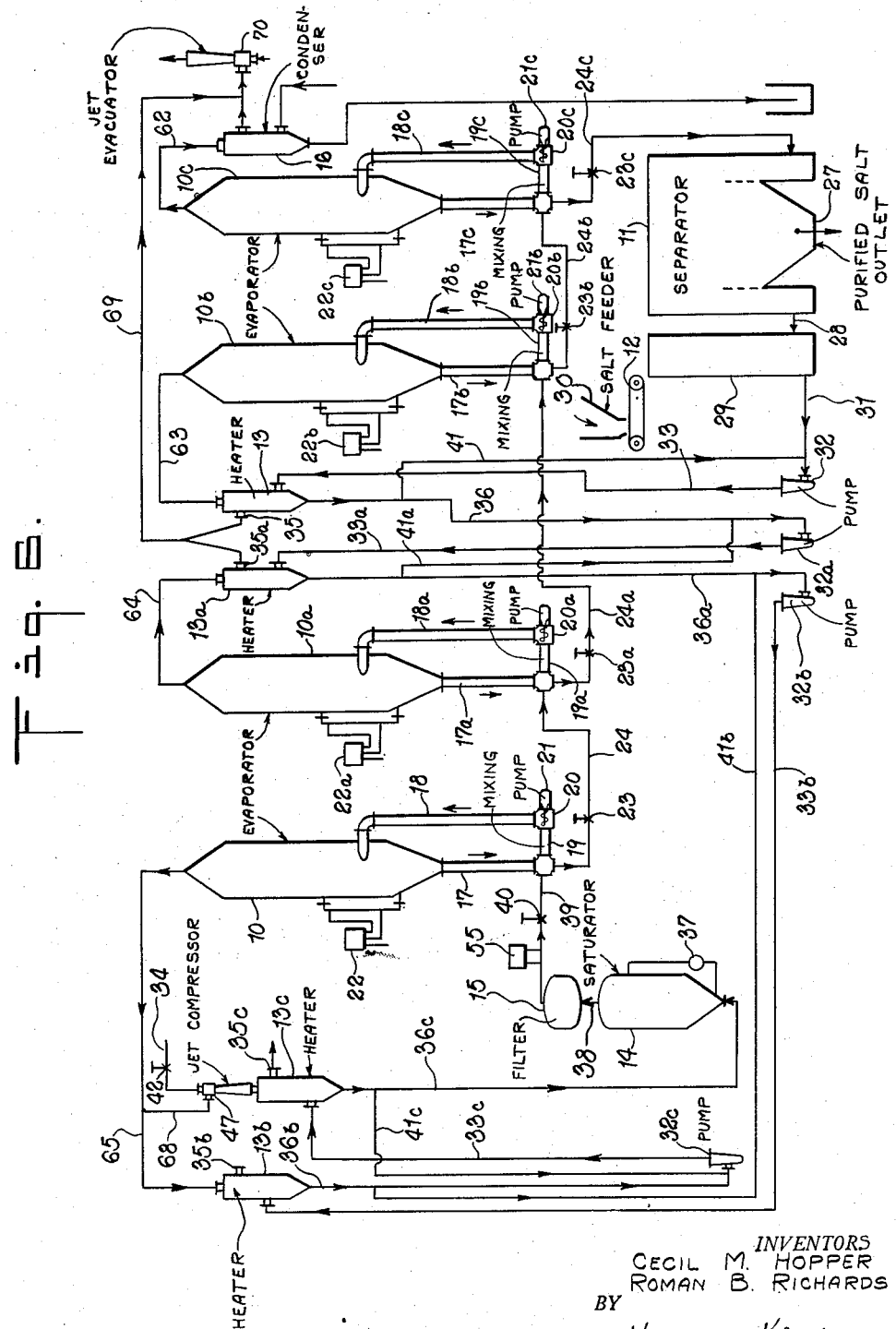

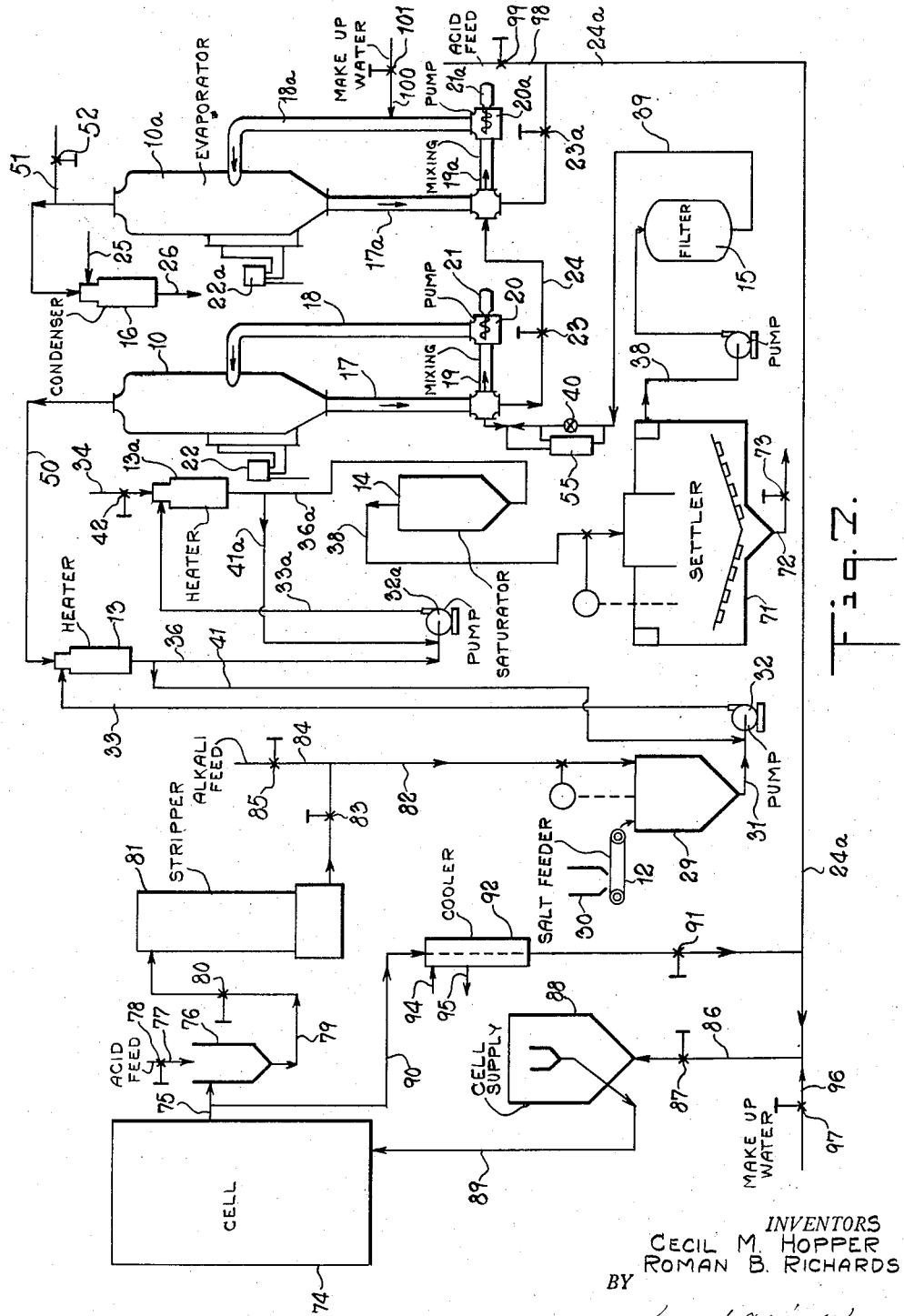

METHOD AND APPARATUS FOR TREATING SALTS

Cecil M. Hopper, Evanston, Ill., and Roman B. Richards, Watkins Glen, N. Y., assignors to International Salt Company, Scranton, Pa., a corporation of New Jersey Application June 21, 1952, Serial No. 294,846

26 Claims. (Cl. 204—99)

This invention relates to method and apparatus for treating salts and relates particularly to a method and apparatus for separating from an impure salt or other soluble substance derived from an impure source an impurity comprised therein. This application is a continuation-in-part of our application Serial No. 215,754, filed March 15, 1951, for "Method and Apparatus for Purifying Salt" (now abandoned).

Generally speaking it is an object of this invention to provide apparatus and method whereby a salt or other soluble substance can be separated from an impurity comprised in an impure source in a manner which is relatively inexpensive both as regards processing and as regards the equipment used, the method and apparatus being such that it can be continuously used for relatively long periods of time without the shutdowns for reconditioning.

While this invention is applicable to many types of refining problems, it is particularly applicable to the treatment of impure sodium chloride or other salts and soluble substances derived from impure sources whose solubility varies with temperature changes. The description of the invention will be illustrated primarily in connection with the treatment of sodium chloride from a source of crude impure material such as mined rock salt or sea salt (solar salt), and in the following description the terms salt and sodium chloride have been used largely interchangeably except when the term salt is expressly used so as to have a more general connotation.

Salt such as mined rock salt usually consists of sodium chloride to the extent of about 90% to 98%, the balance being impurities such as dirt and calcium sulphate and the calcium sulphate being the principal impurity. Such salt, because of its low purity, has restricted utility.

Accordingly to generally employed refining procedure as used heretofore impure salt has been partially purified so as to obtain a product of medium purity by treatment of saline solutions obtained directly from wells or from solutions produced by dissolving previously produced impure substances in water or other fluid substances. This has been accomplished in several ways, principally by the use of vacuum evaporators ranging from single to quadruple effect, the triple effect and quadruple effect systems being generally used by reason of better economy. In such systems the heat for evaporating the solvent from the solution is supplied by out-of-contact condensation of steam using heat transfer surfaces such as tubular surfaces comprised in the evaporators. In such systems the length of operating periods during which the product may be advantageously recrystallized in the evaporators is adversely affected by the fact that the heated surfaces may become coated with impurities or other deposits to such extent as to restrict heat transfer through the tubes with resultant progressively decreased capacity.

When systems of the type above referred to are used in the purification of sodium chloride the salt is produced in the form of small cubical crystals, salt in this form having the widest commercial application.

Another type of salt, namely, so-called grainer salt has been produced by evaporation of water from brine in open pans. The evaporation of the brine may be assisted by tubular heating surfaces arranged to heat the brine in the pan. The salt crystals produced in this way are called "flakes" and have certain special applications.

In addition to the above, salt of relatively high purity has been produced by systems similar to those hereinabove referred to for the production of medium purity salt except that impurities in the brine are removed or reduced in quantity by relatively expensive chemical or physico-chemical treatments prior to evaporation. Such chemical or physico-chemical treatment has also been resorted to in supplying saturated brine to a treating cell wherein the sodium chloride is subjected to electrochemical decomposition in the production of chlorine and certain byproducts.

In our Patent No. 2,555,340 for "Method and Apparatus for Refining Salt or Other Soluble Substances," which resulted from our application Serial No. 600,030, filed June 18, 1945, we have described certain method and apparatus for the production of a salt or other soluble substance of high purity from a source of an impure salt by a continuous operation. Our present invention, as compared with the invention disclosed and claimed in our aforesaid prior application, is directed to certain modifications and improvements affecting both the method and the apparatus. Our present invention comprises several features which preferably are employed in combination, but which may be employed independently so as to obtain the advantages resulting from such features when such features are used independently.

The main impurity in rock salt or brine is calcium sulphate as pointed out above. In order to remove the calcium sulphate from the salt the prior practice has been to remove the calcium sulphate either by chemical treatment or by heating the brine. When high purity salt is desired the chemical treatment is utilized in any case which costs about one dollar per ton of salt treated. However, because calcium sulphate has inverse solubility as compared with sodium chloride in that calcium sulphate tends to become less soluble upon increase in temperature, particularly for temperatures above about 176° F., it is possible to partially remove calcium sulphate by heating the brine until the calcium sulphate precipitates out. The type of process wherein the calcium sulphate is partially removed in this way is commonly referred to as the Alberger Process. However, even when such chemical or physico-chemical treatment is resorted to, undesirable soluble salts become concentrated in the evaporator and other insoluble salts intended to be removed by the preliminary chemical or physico-chemical treatment such as calcium carbonate and magnesium hydroxide also tend to accumulate in the evaporators and often act as nuclei for the formation of sodium chloride crystals thus making it extremely difficult to produce an extremely high grade salt and requiring very close control of the preliminary treating steps in order not to result in the production of off-grade salt.

In practicing the present invention as exemplified in connection with the production of purified sodium chloride advantage is also taken of the inverse solubility of calcium sulphate in relation to sodium chloride, but, instead of the calcium sulphate being precipitated out by heating the brine to accomplish this purpose, the calcium sulphate in the crude salt fed into the system remains undissolved and can be removed by filtration or other known methods of separation. In carrying out this invention impure salt is dissolved in a saturating zone wherein the temperature and pressure are substantially greater than that prevailing in the evaporation zone. When the brine is introduced in the evaporation zone a drop in temperature takes place with the result that the brine becomes or remains undersaturated with respect to the calcium sulphate even though the concentration of the sodium chloride becomes substantially increased or the sodium chloride may be precipitated out in accordance with the preferred practice of this invention. This is the case notwithstanding that the solution which is produced in the saturating zone is substantially saturated as regards both sodium chloride and calcium sulphate. Any undissolved material whether dirt or calcium sulphate is separated from the brine before the brine is taken into the evaporation or crystallizing zone with the result that the sodium chloride becomes separated from such impurities and, if desired, can be precipitated out so as to possess high purity. According to this invention sodium chloride having purity in excess of 99.98% can be produced directly from a source of relatively impure salt such as dirty rock salt.

In the treatment of sodium chloride according to this invention brine solution containing dissolved sodium chloride is heated by condensation of vapor in direct contact with the brine solution and with the attendant addition thereto of the condensate resulting from condensation of the vapor, and impure solid salt is dissolved in the so-heated and diluted brine solution to produce a more concentrated solution which preferably is substantially completely saturated with respect to sodium chloride at the temperature to which the brine solution has been heated. Since the brine solution has become concentrated by dissolving the salt therein the pressure, as well as the temperature, is such that at this step in the operation the salt remains dissolved in the brine under the prevailing conditions of temperature and pressure. During saturation all or part of the calcium sulphate contained in the impure material tends to remain undissolved depending on the extent to which the brine that is introduced into the saturating zone in the system is already saturated with the calcium sulphate. Moreover, any dirt remains undissolved. The concentrated brine is then separated from the undissolved material and is introduced into an evaporation zone which is maintained under a pressure such that the clarified brine solution boils at a temperature substantially lower than that of the brine solution during the dissolution of the salt therein. Due to the reduction in both temperature and pressure as well as the separation and removal of vapor the proportion of sodium chloride in relation to solution saturation is increased and in preferred practice of this invention there is simultaneous production of crystallized salt which, as aforesaid, is in a high state of purity when so produced. The residual salt-containing brine is then removed from the evaporation zone to a separating zone wherein salt is removed leaving residual brine. Salt may be removed from the brine by physical removal of purified crystallized salt or by electrochemical decomposition of the salt and removal of the products of the electrochemical decomposition. Brine from which salt has been removed may then be returned to the initial stage wherein the brine is heated by condensation of vapor in direct contact therewith.

It is thus seen that the operation is one which lends itself to continuous operation and it is to be noted that there is an avoidance of heat exchange surfaces for effecting out-of-contact heat exchange inasmuch as the vapor is brought into direct contact with the brine. By thus eliminating out-of-contact heat exchange surfaces such as tubular heating surfaces the equipment is simple and relatively low in cost. Moreover, in preferred practice of this invention advantage and use is taken of the fact that a saturated brine solution can be raised to a temperature that is about 14° F. higher than the temperature of the saturated steam by the expedient of bringing the steam into direct contact with the brine. For example, saturated steam at 14.7 pounds per square inch absolute pressure has a temperature of 212° F. However, when saturated brine is brought into direct contact with the steam the resulting brine temperature is about 226° F. This fact has been utilized to materially improve the overall efficiency of the system and attention is also called to the fact that the employment of superheated steam offers no problems when the steam is brought into direct contact with the brine whereas in tubular heat exchangers the superheat is ordinarily removed so that efficient heat transmission can take place.

A further feature and advantage of this invention resides in the feeding of solid impure salt into the system rather than a previously prepared brine solution as has been the usual practice heretofore. Moreover, it is a further feature and advantage of this invention that the impure salt is introduced into the brine that is returned from the step of salt removal to the step of heating the brine by condensation of vapor therein so that the solid impure salt is heated along with the brine with resultant increased efficiency in the production of a more concentrated solution. By thus adding solid salt to the system instead of brine there are very substantial economies in the amount of heat required to be introduced into the system. The specific heat of the salt is much lower than that of the brine. Moreover, where solid salt is introduced in the system the quantity of material which must be added cold and which must be heated is only approximately one-fourth that which is required when saturated brine is introduced into the system. It is thus apparent that in raising the temperature of the raw materials added to the system to the temperature to which the circulating brine must be heated, very substantial economies in heat input are made possible. Moreover, if solid impure salt were to be added after the heating of solution has been accomplished it would have an undesirable cooling effect prior to the saturation and clarification steps which would detract from the efficiency of the system. While the salt is thus taken into the heater or heaters wherein the brine is heated by condensation of vapor in direct contact therewith, the undissolved salt is preferably carried in the heated brine beyond the heater or heaters to a saturator which is so disposed that the brine will pass upwardly through the saturator and which is so dimensioned that the solid salt carried into the saturator will become suspended in the moving brine solution, but will for the most part be retained in the saturator. The impure salt is fed into the system so that the saturator will preferably remain only partially filled with salt even when substantially complete saturation is effected in the saturator thereby avoiding the carrying of any substantial quantities of undissolved salt beyond the saturator. Before the solution is introduced into the evaporator wherein vapor is separated from the solution any solid material which may be carried beyond the saturator is preferably removed as by some suitable means such as a filter.

It is a further feature of this invention that when the brine solution is introduced into the evaporator it is introduced in such a manner as to avoid formation of crystalline deposits and in such a way as to avoid shutdowns for cleaning. According to this feature of the invention the residual brine contained in the evaporator is circulated from the evaporator through a mixing zone and then back to the evaporator. The mixing zone is maintained under a hydrostatic pressure substantially greater than that of the vapor in the evaporator. The pressure in this mixing zone is sufficiently high so that when the clarified salt solution which is introduced into the evaporator becomes blended with the residual brine from the evaporator which is circulated through the mixing zone there will be no boiling or other factor inducing crystallization of salt from the solution in having its temperature lowered upon being mixed with the residual brine that has been reduced to a lower temperature in the evaporator. This is especially important when the clarified solution that is fed into the evaporator is substantially saturated and when crystallized salt is produced in the evaporator. The mixture of the residual brine and the added salt solution is then directed up into the evaporator with a consequent gradual lowering of the hydrostatic pressure so that the boiling and any crystallization of salt will occur only in the evaporator chamber in the manner desired and without formation of salt deposits on the circulating apparatus parts.

Further features of this invention relate to its adaptation to both heating and vapor separation in a plurality of stages with resultant further economies. Thus, after an initial separation of vapor from solution in a first evaporation zone the residual brine may be taken to another evaporation zone wherein additional vapor is separated therefrom and wherein the temperature of the brine is further reduced. Crystallized salt may form in either or both of the evaporation zones. After the salt has been separated from the cooled salt-containing solution residual solution may then be heated in a plurality of stages and in at least one of the stages the temperature of the brine will be sufficiently below that of the condensing temperature of vapor removed from one of the evaporators so that the brine may be partially heated by condensation in direct contact therewith of vapor removed from one of the evaporators. Further heating of the brine may then be accomplished by employment of a vapor under a higher pressure which may be supplied from an outside source or which may be supplied by compression of vapor evolved in one of the evaporators so that when the vapor is condensed in direct contact with the brine a temperature can be reached which is substantially higher than that prevailing in any of the evaporators. In this way further economies in energy put into the system can be realized.

While the practice of this invention can be used in connection with a system wherein evolved vapor is reused by compressing it by means of a mechanical compressor, the invention is also adapted for employment when vapor, e. g., steam is supplied from an outside source. In either case advantage may be obtained of condensing vapor evolved from an evaporator by utilizing a fluid supplied at a lower temperature so as to maintain a suitable pressure in at least one of the evaporators to accomplish the desired vapor separation. This is particularly desirable when plural effects are resorted to for reasons of economy. However, when energy is introduced into the system by vapor supplied from an outside source for completing the initial heating of the brine, a corresponding amount of vapor should be discharged from the system so as to maintain a substantially constant amount of solution recirculated in the system.

According to certain practice of this invention vapor may be supplied from an outside source at a relatively high pressure so that it may be passed through a jet compressor whereby vapor evolved in an evaporator may be compressed and commingled with the vapor supplied from an outside source so that the vapor evolved in the evaporator may be utilized in heating the brine to a temperature substantially higher than that prevailing in the evaporator. According to certain other practices of this invention part of the vapor evolved in an evaporator may be used without compression to partially heat the brine and an additional portion or the vapor may be compressed for completing the heating of the brine to the temperature desired.

While it is one of the principal advantages of this invention that it affords means and method whereby crystallized salt such as sodium chloride may be economically produced and recovered in a high state of purity, further features and advantages of this invention relate to the treatment of a salt in a system wherein salt is removed from a solution thereof by electrochemical decomposition. Thus, one of the principal sources of commercially produced chlorine resides in the electrochemical decomposition of a substantially saturated solution of sodium chloride with production of chlorine and sodium leaving residual sodium chloride solution of reduced saturation. Since the effect of the electrochemical decomposition is to remove the sodium chloride while leaving any impurities remaining in the solution, the concentration of impurities tends to build up excessively if the spent solution is recirculated through the treating cell wherein the electrochemical decomposition of the sodium chloride takes place. This building up of impurities has heretofore been met by discarding a relatively large proportion of the sodium chloride solution removed from the treating cell even though it may be about 85% saturated with sodium chloride or by resort to chemical treatments which are relatively costly and result in treating expense that is comparable to the value of the sodium chloride in the sodium chloride solution that is passed to waste when this expedient is utilized. The present invention affords improved means for separating an impurity such as the calcium sulphate comprised in impure rock salt so that build-up of impurity concentration in the solution subjected to electrochemical decomposition in the treating cell can be successfully prevented with resulting substantial economies of operation as compared with prior practice. In utilizing this invention in this manner sodium chloride solution which has been subjected to electrochemical decomposition in an electrolytic cell and which is withdrawn from the cell in unsaturated condition can have its concentration built up to substantially saturated condition using an impure source of sodium chloride and with separation of impurities from the salt. Preferably this is accomplished by dissolving the desired amount of salt in a portion only of the spent solution withdrawn from the treating cell and then subjecting this portion of the solution to treatment according to this invention whereby crystallized salt is formed during the evaporation stage. The solution containing the crystallized salt is later commingled with another portion of solution withdrawn from the treating cell which, being unsaturated, results in the redissolving of the precipitated sodium chloride to form the saturated solution fed into the treating cell. In connection with such operations involving removal of salt by its electrochemical decomposition rather than physical removal of crystallized salt certain chemical treatments are also preferably employed which render the treating cycle more effective for the supply of saturated solution in desired condition to the treating cell.

Further purposes, features and advantages of this invention will be apparent in connection with the following description of examples of typical practice of this invention in connection with the accompanying drawings which are diagrammatic and wherein.

Fig. 6 is a diagrammatical showing in side elevation wherein this invention is adapted to plural effects both as regards crystallization of salt and heating of the brine, and Fig. 7 is a diagrammatical showing in side elevation which exemplifies the application of this invention to the supply of a salt solution to a treating zone wherein salt is removed from solution by electrochemical decomposition.

Figure 1:
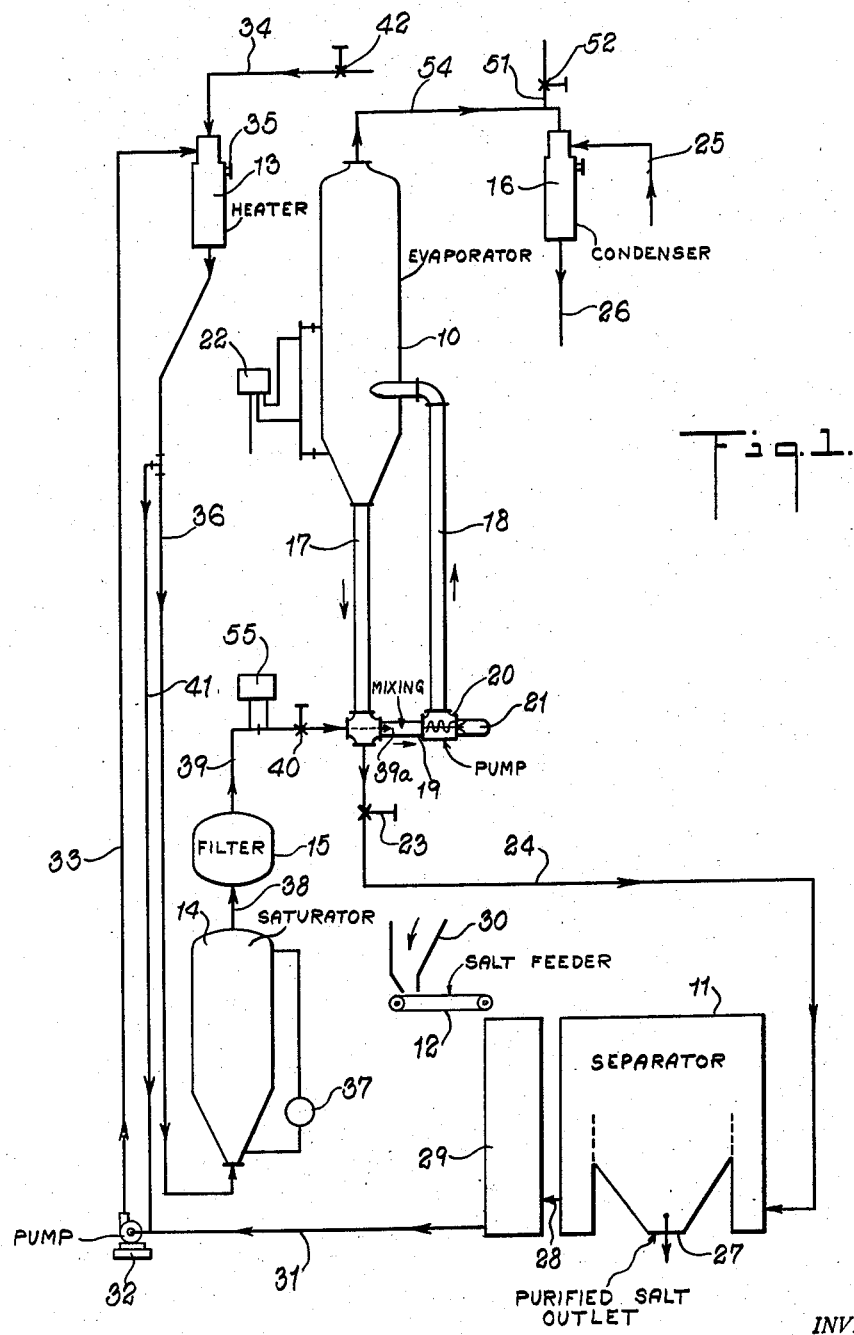
Fig. 1 is a side elevation, largely diagrammatic, of one type of apparatus embodying and used according to this invention which utilizes vapor supplied from an outside source for introducing energy into the system.

The embodiment of this invention shown in Fig. 1 affords a simple illustration of the practice of the method and apparatus of this invention whereby certain of the features and advantages thereof may be realized in the production of purified crystallized salt from a source of impure salt such as solid rock salt. The principal structural elements of the apparatus shown in Fig. 1 are the evaporator 10, the separator or salt settler 11, the salt feeder 12, the heater 13, the saturator 14, the filter 15 and the condenser 16.

The evaporator 10 may be of any suitable type and, for example, may consist of a vertically disposed cylinder made of any suitable material. The primary function of the evaporator is to provide a vessel or chamber in which vapor may be separated from a boiling brine solution with resultant lowering of the temperature of the brine solution introduced into the evaporator and concentration of the brine solution so as to effect, according to the instant example, simultaneous crystallization of salt from the solution during the evolution of vapor therefrom. Since the brine solution boils in the evaporator with separation of vapor from the solution this zone is referred to as the evaporation zone in the system.

The evaporator 10 is provided with an external circulation system through which the residual brine and any crystallized salt contained therein is continuously removed from the evaporator body and returned to the evaporator body. This circulation system comprises the outlet pipe 17, the return pipe 18, and the horizontal pipe section 19 which is the mixing zone or chamber in the system whose function will be described more in detail hereinbelow. The residual brine in the evaporator is circulated downwardly through the line 17 to the mixing chamber 19 and upwardly through the line 18 by the pump 20 which may be operated by a suitable motor 21. This circulation system takes the residual brine and any crystallized salt contained therein from the bottom of the evaporator body and returns it to the evaporator body at a position somewhat below the normal liquid level in the evaporator body. While it is not necessary to do so the interior of the evaporator 10 may, if desired, be provided with such baffles as may be desired for directing the flow of solution and crystals formed therein.

The normal liquid level to be maintained in the evaporator 10 may be controlled in any suitable manner as, for example, by a level control unit 22 which is effective to automatically operate the valve 23 in the line 24 that directs residual brine and crystallized salt contained therein from the bottom of the pipe 17 to the separator 11. The apparatus for providing a suitable level control unit and means for automatically adjusting the valve 23 may be of any known or conventional type for accomplishing this purpose, and serves to permit withdrawal of the residual brine and crystallized salt from the evaporator whenever brine in the evaporator tends to rise above thep redetermined liquid level that is normally to be maintained therein.

The top of the evaporator 10 communicates with the vapor discharge line 54 which directs the vapor evolved in the evaporator from the evaporator to the condenser 16. A fluid such as water may be directed through the condenser 16 by the lines 25 and 26 for direct contact with the vapor taken from the evaporator to the condenser by the line 54. Suitable controls of conventional type may be associated with the condenser 16 so as to maintain the pressure of the vapor within the evaporator at the desired predetermined pressure as by bleeding a small amount of air into line 54 from the line 51 controlled by the valve 52.

Residual brine from the evaporator and crystallized salt contained therein are directed by the line 24 to the separator 11 which, in the embodiment shown, is a salt settler that permits the crystallized salt to settle out therein for discharge through the salt outlet 27. The separator 11 should be of sufficient area to permit the crystallized salt to settle out from the brine circulating through it. Concentrated slurry taken from the outlet 27 may be treated for further separation of any brine contained in the removed crystallized salt in any suitable way as by centrifugal machine or a filter and any such separated brine preferably is returned to the separator 11.

The clarified brine from which the crystallized salt has been separated is directed from the separator 11 by the line 28 to the salt inlet tank 29 which may be in the form of any suitable chamber or container for the solution. The solid impure salt, such as rock salt, is fed from the hopper 30 into the salt inlet tank 29 by the salt feeder 12. The salt feeder 12 may be in the form of a continuous belt which carries the impure salt from the hopper 30 for discharge into the tank 29 and the rate at which the salt is fed into the system may be controlled by controlling the rate of operation of the belt.

The brine removed from the separator containing the solid impure salt added thereto in the tank 29 is taken from the tank 29 by the line 31 to the pump 32 which forces the brine and impure salt upwardly through the line 33 to the heater 13. The heater 13 may be at such level that the flow through the rest of the system will be accomplished by gravity although this is not necessary and the flow through the rest of the system can be controlled, if desired, by suitable pump means.

The heater 13 is adapted to heat the brine and the salt contained therein by condensation of vapor in direct contact with the brine. The vapor is introduced into the heater 13 by the line 34 and the heater may be of any suitable type such as a chamber wherein the vapor is brought into intimate contact with the brine and the salt that are introduced into the heater by the line 33. Any uncondensed vapors may be permitted to escape from the heater through the vent 35.

The heated brine in the heater 13 and the impure salt contained therein are next taken from the heater 13 by the line 36 to the saturator 14. The saturator 14 consists essentially of a vessel such as a vertically disposed cylinder of substantial height whose diameter is such as to prevent most of the undissolved salt from being carried beyond the saturator while being sufficiently small to permit suspension of undissolved salt due to the upward velocity of the brine within the saturator. The saturator may be provided with a pressure differential gauge 37 whereby the amount of undissolved salt in the saturator may be indicated. Alternatively the amount of undissolved salt in the saturator 14 may be indicated by variation in the absolute weight of this vessel.

The saturated brine solution from which most of the undissolved salt has been separated by retention in the saturator 14 is taken by the line 38 to the filter 15 wherein any undissolved material such as calcium sulphate or dirt that may be carried out of the separator is removed from the brine. The filter may be any suitable type and may be a conventional filter suitable for operating under the pressure prevailing therein and containing such filtering medium as is adapted to filter out insoluble solids present in the liquid supplied thereto.

The clarified brine is taken from the filter through the line 39 which is controlled by the valve 40, the valve 40 regulating the rate of flow of brine through the system. The rate of flow may be indicated by flow meter 55, which may be of any conventional design. The outlet 39a of the line 39 is located at an intermediate point within the line 19 that constitutes the mixing chamber so that the clarified brine is mixed at this point with the residual brine and crystallized salt which is being circulated through the lines 17, 18 and 19 by the pump 20. The outlet of the line 39 is so positioned that the clarified brine is all taken into the evaporator 10 without being taken directly to the separator 11 by the line 24.

As above pointed out the valve 40 in the line 39 controls the rate of flow of brine through the system. In order to prevent flooding of the heater 13 by brine and impure salt supplied thereto by the pump 32 a by-pass line 41 is inserted in the discharge line of the heater 13 so as to permit liquid in excess of that passing through the valve 40 to return to the suction or inlet side of the pump 32. In this way the flow into the saturator 14 may be controlled responsive to the amount of brine passing the valve 40. Since in the embodiment shown solid impure salt is contained in the brine taken to the heater 13 and since the brine is heated in the heater 13 with resultant dissolution of some of the salt therein, the by-pass line 41 serves to commingle the heated brine solution contained therein with the cooler brine solution taken from the salt inlet tank 29 under hydrostatic head provided by the by-pass line 41 that is sufficiently great to prevent substantial vaporization of the brine discharged from the by-pass line 41 as it is commingled with the brine carried to the pump 32 by the line 31. In order to compensate for loss of pressure head due to the suction exerted by the pump and friction in the brine lines it is well to provide a hydrostatic head of approximately 1.5 feet per degree of temperature differential between the temperature of the cool brine taken from the salt adding tank and the temperature to which the brine is heated in the heater.

In carrying out a typical operation for the recovery of pure sodium chloride from impure rock salt according to this invention the system is first filled with water as by filling the separator 11 and operating the pump 32 to circulate the water through the heater 13, the saturator 14, the filter 15, and the evaporator 10 until the operating level within the evaporator 10 has been reached. After the system has been filled, steam under pressure is then admitted to the heater 13 and at the same time salt from the hopper 30 is fed into the salt inlet tank 29 by the salt feeder 12. The circulation through the system is then maintained until the desired quantity of impure salt is carried into the saturator 14 as indicated by the pressure differential gauge 37 and the operation of the salt feeder is thereafter regulated so as to maintain the desired amount of salt in the saturator 14.

Due to the addition of steam into the heater 13 the circulating brine becomes heated with the addition of condensed steam thereto. As the temperature of the circulating solution increases water is admitted to the condenser 16 so as to condense such vapors as may be released in the evaporator 10. As the heating progresses the temperature of the brine carried from the heater and through the saturator and filter into the evaporator will soon exceed the boiling point of the brine solution in the evaporator under the vapor pressure maintained in the evaporator due to the action of the condenser 16. When this condition is reached the brine in the evaporator 10 boils and due to the resulting lowering of the temperature and removal of water and since the brine will not become supersaturated with sodium chloride there is simultaneous crystallization of cubical crystals of sodium chloride therefrom. As the boiling of the brine in the evaporator 10 continues the supply of clarified and substantially saturated brine solution is continued under the control of the valve 40. In thus supplying the heated and saturated brine to the evaporator there is attendant lowering of temperature and pressure. The heated and clarified brine is commingled with the brine which has been reduced to a lower temperature in the evaporator 10 in the pipe 19 which provides a mixing zone maintained under hydrostatic head by the lines 17 and 18 whereby the reduction in temperature is accomplished while maintaining a pressure sufficiently high to prevent flashing which would result in crystallization of salt in passing the valve 40 to the outlet 39a of the line 39 and in lines 19 and 18 and which, if permitted to occur, would soon clog the parts in question. The saturated brine as thus commingled with the residual brine in the evaporator is then directed by the line 18 into the evaporator with gradual reduction in pressure so that substantial crystallization of salt does not begin to occur until the commingled solutions are introduced into the evaporator.

While maintaining the liquid level in the evaporator substantially constant the purified salt crystals and residual brine are taken from the evaporator 10 to the separator 11 where they are separated out and the residual brine is then taken to the rock salt inlet tank 29 for recirculation through the system.

As indicated above the main impurities in rock salt are calcium sulphate and dirt, the calcium sulphate being the principal impurity. The circulating brine at the temperature prevailing in the saturator soon becomes saturated with respect to the calcium sulphate with the result that further dissolution of the calcium sulphate does not occur during continued carrying out of the process and the calcium sulphate and any dirt remains undissolved and either remains in the saturator 14 or is removed by the filter 15. While dissolved calcium sulphate is taken to the evaporator 10, nevertheless, due to the inverse solubility of the calcium sulphate and the lowering of the temperature of the brine solution upon being directed into the evaporator 10, the brine solution within the evaporator 10 is much below the saturation point of the solution with respect to the calcium sulphate notwithstanding the removal of vapor from the brine solution in the evaporator and none of the calcium sulphate precipitates out in the evaporator. For this reason it is only the sodium chloride which crystallizes out in a pure condition in the evaporator and it is separated from the brine solution in pure form in the separator 11.

When conditions for continuous operation have been established the rate of flow through the system as regulated by the valve 40 is preferably such that the brine leaving the saturator 14 will be approximately completely saturated. While the dissolution of the impure salt commences in the heater 13, the dissolution is carried to approximate saturation in the saturator 14. The velocity of flow of brine through the saturator 14 preferably is sufficiently low so that most of the undissolved salt will remain in the saturator and so that an undue amount of undissolved salt will not be taken to the filter 15. However, by providing sufficient velocity within this saturator 14 the undissolved salt can be maintained to some extent in a condition of suspension so as to provide a teeter bed of substantial depth whereby more ready saturation of the brine can be accomplished.

In carrying out the refinement of salt according to the invention as illustrated in connection with Fig. 1 the heat losses from the system are the sum of the radiation losses, plus the loss due to increasing the temperature of the impure salt, plus the heat contained in the vapor passing to the condenser 16, and plus the heat contained in the removed refined salt. These losses are constant and, therefore, by regulating the pressure prevailing in the evaporator 10 while maintaining a constant flow through the system an economical balance of heat flow is established wherein the input of steam balances the heat losses and for maximum efficiency the steam input is such that there is little or no excess of vapor discharged from the vent 35 of the heater 13. In continuous operation the quantity of brine circulated through the system remains substantially constant and the amount of steam introduced into the system through the line 34 is approximately the same as the amount of vapor taken from the evaporator 10 to the condenser 16.

In a typical operation which may be conveniently carried out according to this invention the heater 13 may be maintained at substantially atmospheric pressure and steam may be admitted thereto through the line 34 at a gauge pressure of approximately 5 pounds per square inch. The amount of steam introduced may be controlled in any suitable manner as by the manually operated valve 42. Since it is possible by directly contacting the steam with brine solution to heat the brine solution to a temperature substantially above the boiling point of water at atmospheric pressure addition of steam in the manner referred to will heat the brine in the heater 13 to a temperature of approximately 224° F.

The controls for the condenser 16 are set to maintain the absolute pressure of the vapor within the evaporator 10 at approximately 10 inches of mercury. The temperature of the brine within the evaporator 10 will be reduced during evolution of vapor therefrom to the saturation temperature corresponding to the vapor pressure in the evaporator plus the rise in boiling point due to the presence of the dissolved salt. When the vapor pressure within the evaporator is approximately 10 inches of mercury absolute the evaporator operates at approximately 178° F. In order to prevent vapor release from the brine which is at a temperature of about 220° F. as it passes through the valve 40 the pressure maintained in the mixing zone provided by the line 19 should correspond to that provided by a hydrostatic head of at least 22 feet below the normal liquid level maintained in the evaporator. For different temperature differentials the pressure maintained in the mixing zone would be different and roughly should correspond to at least a pressure head of one-half foot per degree of temperature differential between the temperature of the admitted saturated brine and the temperature of the brine prevailing in the evaporator. Preferably the amount of recirculated brine from the evaporator that is directed through the mixing zone provided by the line 19 is several times that of the heated brine entering the mixing zone through the line 39 so that the commingled residual brine and added brine will be at a temperature only about 3 or 4° above the temperature of the brine in the body of the evaporator 10. In this way the dissolved salt contained in the commingled brine is only slightly in excess of saturation conditions within the evaporator body and the commingled brines can be directed into the evaporator body substantially below the normal liquid level contained therein without premature boiling or crystallization of salt which would otherwise tend to build up salt encrustations in line 18.

As the result of the substantial lowering of temperature of the brine after entry into the evaporator 10, as well as the concentration of the brine due to the separation of vapor therefrom, purified salt is rapidly crystallized from the brine and may be separated from the brine in the separator 11 and may be recovered for use.

In carrying out the operation as described and illustrated in connection with Fig. 1 about 3000 pounds of steam at approximately 5 pounds per square inch is required for the production of a ton of purified salt. The added steam not only provides the source of heat which compensates for heat losses, but also by condensation in the recirculated brine provides a carrier for dissolving impure salt, and carrying it into the evaporator, a corresponding amount of vapor being separated from the brine during the crystallization of the purified salt and directed out of the system. The production rate of purified sodium chloride will depend on the rate of flow through the valve 40 and the rate of introduction of solid impure salt into tank 29. For any given temperature difference between the saturator 14 and the brine in evaporator 10, a fixed rate of flow through the valve 40 will result in production of refined salt at a definite rate provided the supply of impure salt is sufficient to insure substantially complete saturation of sodium chloride in the brine leaving the saturator. For example, when the brine fed to the evaporator 10 through valve 40 is saturated at 220° F. and the brine entering the separator 11 from the evaporator 10 is at 178° F., a ton of sodium chloride per hour will separate out in separator 11 for each 185 gallons (approximately) per minute flow of brine through the valve 40. Moreover, because in the case of a sodium chloride solution at about 220° F. the amount of calcium sulphate that can be dissolved therein is approximately 33% of the amount of calcium sulphate which could be dissolved in the solution at 178° F., and since in the flash cooling of the brine solution from 220° F. to 178° F. the solution is only concentrated about 6%, the brine solution in the evaporator 10 is far from approaching saturation with respect to calcium sulphate and only the sodium chloride crystallizes out in pure condition. The amount of dissolved calcium sulphate that is recirculated in the system will be about 3.0 grams per liter under such conditions and after the pure sodium chloride has precipitated in the evaporators only a very small amount of the calcium sulphate relative to sodium chloride is taken out with sodium chloride crystals because of mother liquor retained on the removed sodium chloride crystals with the result that the removed crystals will comprise calcium sulphate only to the extent of about .009%. By centrifuging the recovered sodium chloride crystals reslurried with brine made by dissolving such crystals the calcium sulphate content of the recovered salt can be further reduced to as low as .001%. Other impurities contained in the so-recovered salt are negligible and one can readily produce dry sodium chloride according to this invention which consists to the extent 99.99% of sodium chloride. If desired even further absence of impurities in the nature of magnesium compounds can be effected by adding sodium hydroxide, as by adding it to the solution in the salt feeding tank 29, in sufficient quantity to maintain a pH of about 10.6 in the circulating brine thus causing any soluble magnesium compounds to precipitate as insoluble magnesium hydroxide which is removed when the brine passes through the filter 15.

The foregoing description illustrates a convenient way of practicing this invention wherein the heater is maintained at approximately atmospheric pressure while the pressure within the evaporator is maintained substantially below atmospheric pressure. However, the relative pressures and temperatures may be different. For example, the pressure of the vapor within the evaporator might be maintained at substantially atmospheric pressure while the heater may be maintained at superatmospheric pressure such that the brine solution in the heater may be heated to a temperature substantially higher than that of the boiling point of the brine solution under atmospheric pressure, e. g., the heater may be maintained at a pressure such that the brine solution would be heated therein to a temperature of approximately 260° F. In such case the steam admitted by the line 34 would be under a sufficiently high pressure so as to permit condensation of steam in the brine for heating the brine to approximately 260° F. Moreover, the vent 35 in the heater could be provided with a back pressure controller so as to maintain the desired superatmospheric pressure within the heater 13.

Figure 2:
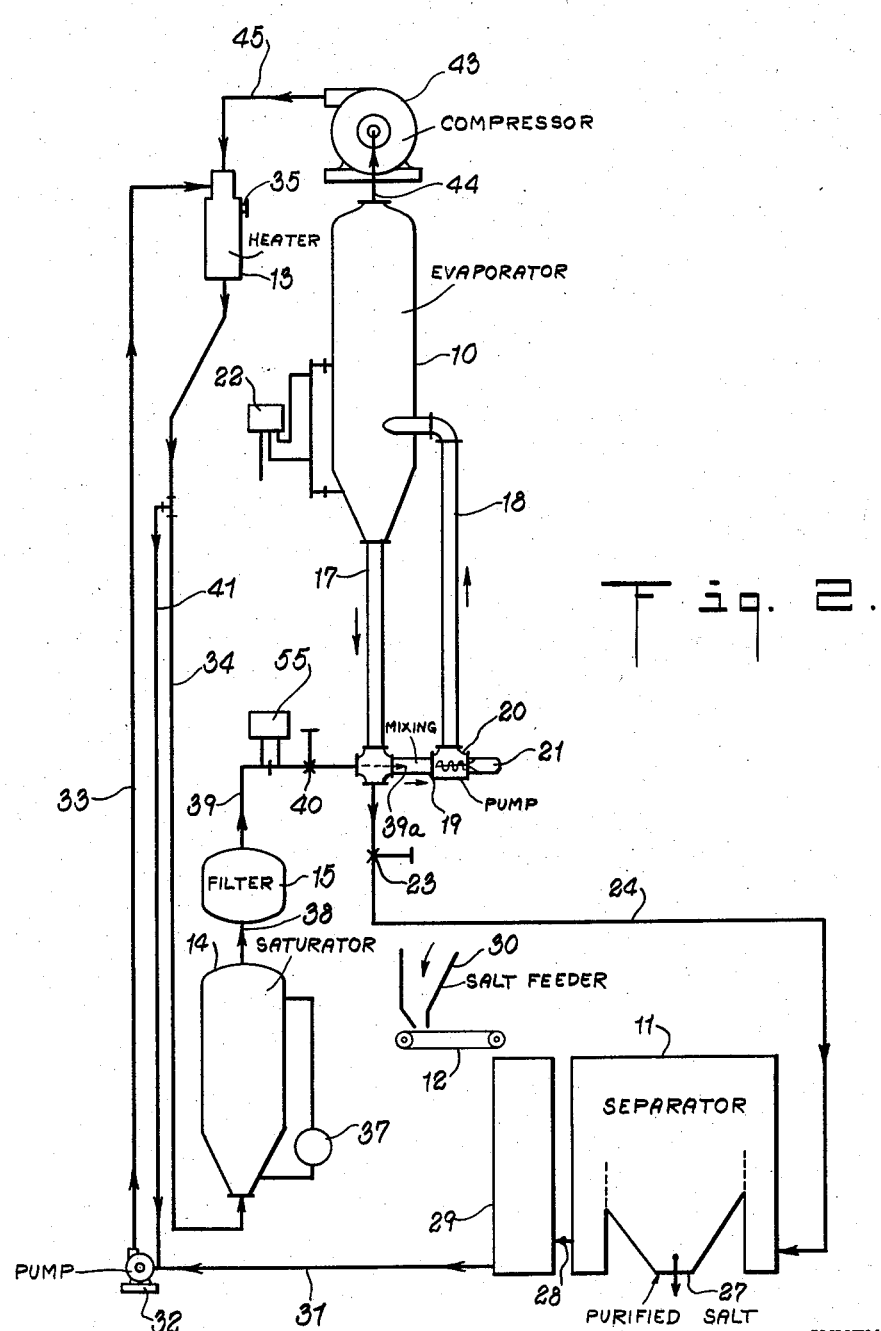
Fig. 2 is similar to Fig. 1 except that a mechanical compressor is used for supplying energy to the system so that vapor evolved in the evaporator may be compressed and used in heating the brine.

The embodiment of this invention shown in Fig. 2 corresponds to that shown in Fig. 1 except that the apparatus in Fig. 1 has been modified by the use of a compressor to compress the vapors evolved in the evaporator so that the evolved vapors may be returned to the system. Such use of the compressor is of utility especially when a relatively cheap source of mechanical power is available. Except for the compressor modification the showing in Fig. 2 is identical with that of Fig. 1 and the various parts have been indicated by corresponding reference characters. In the embodiment shown in Fig. 2 the vapor evolved from the evaporator 10 is directed to the compressor 43 by the vapor line 44 and the vapor compressed by the compressor 43 is directed by the compressed vapor line 45 to the heater 13 for heating the brine introduced into the heater 13 by condensation in direct contact therewith.

When the compressor is employed as shown in Fig. 2 it is preferable in order to minimize installation cost to set up the apparatus so that the pressure at least in the heater is maintained at superatmospheric pressure. Moreover, in order to make the cycle self-sustaining it is necessary to compress the vapor evolved in the evaporator 10 so that the increase in pressure through the compression is equivalent to a 40° F. increase in the temperature of the saturated vapors corresponding to the two pressures. For example, the pressure in the heater 13 may be maintained so that the brine will be heated in the heater 13 to a temperature of the order of 266° F. The actual temperature of the vapor after compression by the compressor may be as high as 500° F., but the pressure will only be approximately 30.5 pounds per square inch absolute and would only heat the brine to approximately 266° F. When the vapor is compressed to maintain such temperatures in the heater 13 the pressure within the evaporator 10 may be maintained so that the saturated brine introduced into the evaporator will boil when cooled to a temperature of about 226° F. Under such conditions the pressure of the vapor in the evaporator would be approximately atmospheric pressure. If it is desired to reduce the pressure differential between that maintained in the heater and that of the boiling brine in the evaporator 10, then an auxiliary supply of heat can be introduced in the system from an external source so as to supplement the energy supplied by the compressor in compensating for heat losses due to radiation, the heating of the impure salt and the loss of heat resulting from removal of the refined product.

Figure 3:
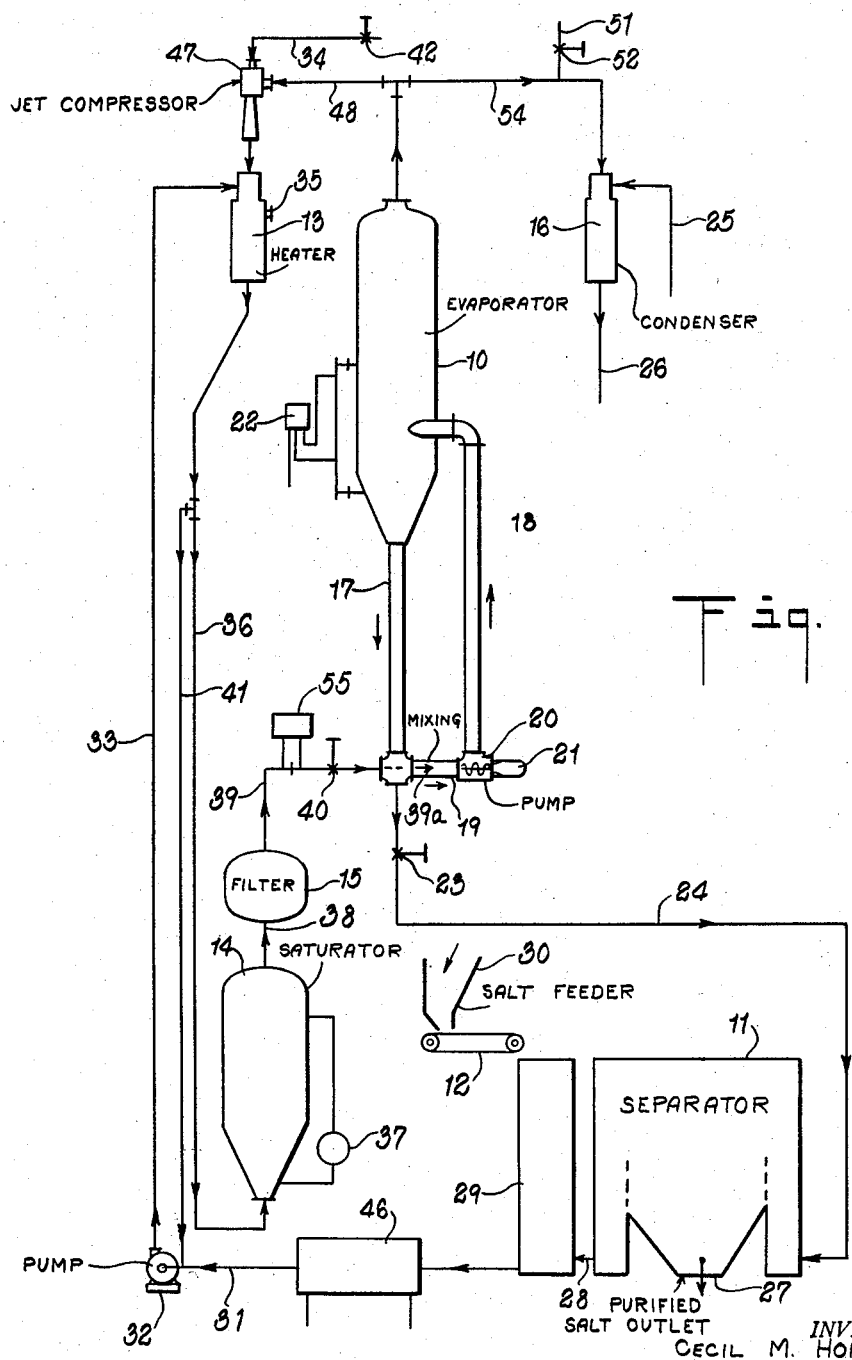
Fig. 3 is similar to Fig. 1 except that the apparatus is modified by the employment of a jet compressor whereby a portion of the vapor evolved in the evaporator is compressed and commingled with vapor supplied from an outside source in heating the brine.

The embodiment of this invention which is shown in Fig. 3 is a modification of that shown in Fig. 1 whereby the amount of steam required per ton of purified salt produced can be considerably reduced by utilizing steam which is supplied from an outside source under a relatively high pressure. This embodiment of the invention is preferable, particularly if a source of steam under relatively high pressure is available at the plant. Except for the modification referred to the embodiment of this invention which is shown in Fig. 3 is the same as that shown in Fig. 1 and the parts thereof have been indicated by like reference characters. The principal difference is that the steam which is introduced from an outside source through the line 34 controlled by the valve 42 is directed through the jet compressor 47. The vapor outlet pipe 54 which directs evolved vapor from the evaporator 10 to the condenser 16 is also connected to the jet compressor 47 by the line 48 so that part of the vapor evolved in the evaporator 10 is compressed in the jet compressor for reuse in heating the brine in the heater 13. The saving in steam by using the embodiment of this invention shown in Fig. 3 depends upon the differential pressure between the evaporator 10 and the heater 13. When the heater is maintained at substantially atmospheric pressure so as to heat the brine solution and the salt therein to about 224° F. and when the controls for the condenser 16 are maintained so that the brine solution will boil in the evaporator 10 at about 178° F., then assuming that the steam which is supplied through the line 34 is at a pressure of about 200 pounds per square inch, the amount of high pressure steam used in producing a ton of purified salt will be approximately 1700 pounds. In using the embodiment shown in Fig. 3 according to the example given about one pound of vapor from the evaporator 10 will be compressed for each 1½ pounds of high pressure steam fed to the jet compressor; and in any case the amount of the vapor passing from the evaporator 10 to the condenser 16 will be approximately the same as that admitted under high pressure to the jet compressor by the line 34. The range of compression employed will be established by the necessity for furnishing sufficient heat in the high pressure steam fed in through the line 34 to equal the sum of the heat losses incident to the operation which include radiation losses, losses of heat in vapor taken to the condenser 16 and losses in heat due to the heating of the impure salt supplied to the system and the heat withdrawn in removing purified salt from the system. If the range of compression afforded by the supply of high pressure steam is too small to compensate for these heat losses, then an auxiliary source of heat may may be supplied to make up the difference so as to prevent build up of the volume of liquid in the system. Such auxiliary heat can be supplied from an external source as by the tubular out-of-contact heat exchanger 46 in the line 31; or in any other suitable way or at any other point in the system whereby heat can be added without increasing the volume of liquid in circulation.

A further improvement in efficiency and a saving in the amount of steam required per ton of purified salt produced can be afforded by the employment of a plurality of evaporators and a plurality of heaters whereby vapor evolved in the system may be condensed in direct contact with cooler brine in the system so as to accomplish a partial heating of the brine. Such an embodiment of this invention is shown in Fig. 4 wherein two evaporators and two heaters are employed.

Figure 4:
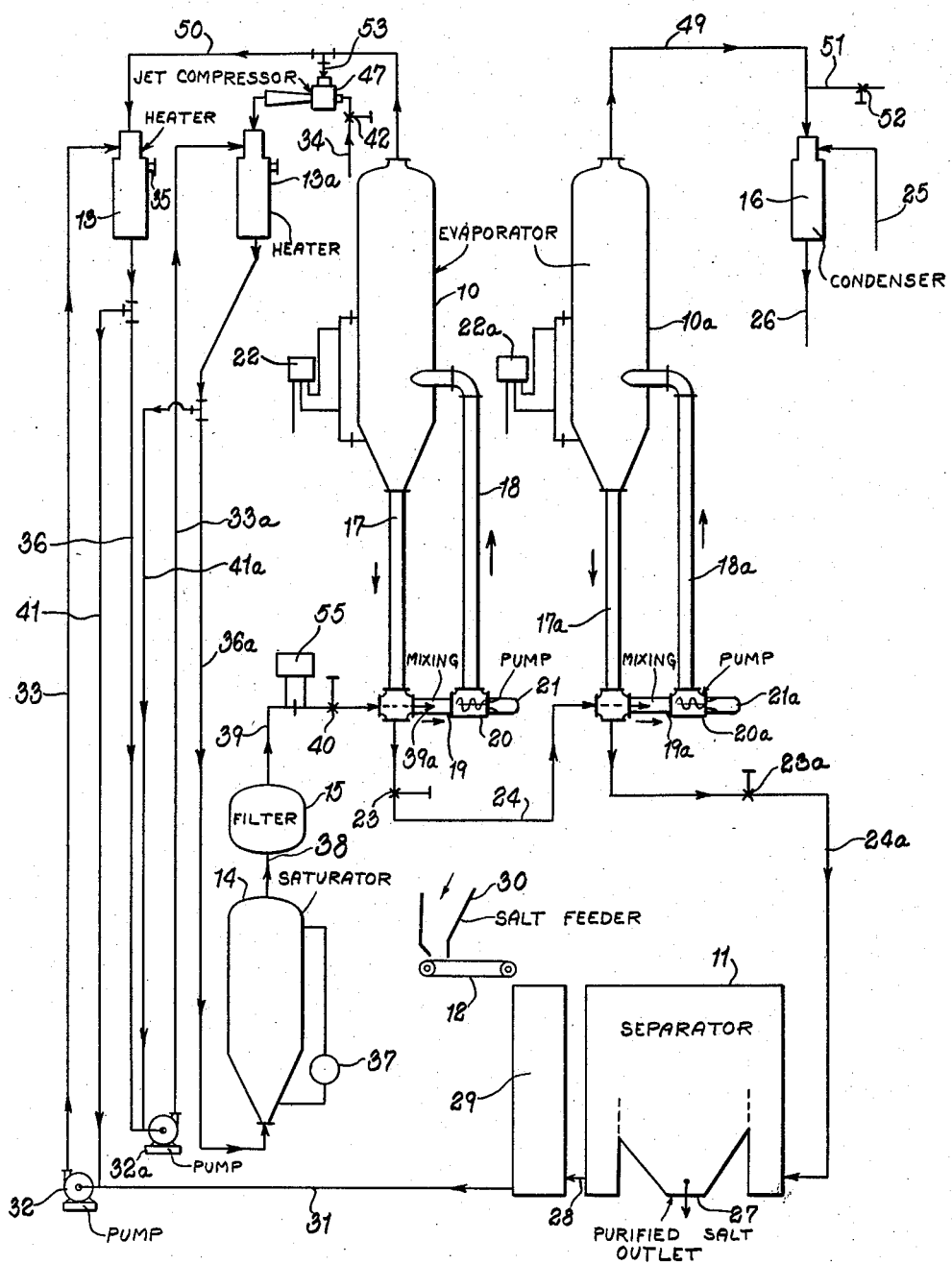
Fig. 4 is a side elevation of apparatus embodying and utilizing this invention wherein both the crystallization and the heating of the brine are carried out in two stages or effects and wherein a jet compressor may optionally be employed for utilizing a portion of the vapor evolved in one of the evaporators in the heating of the brine.

In Fig. 4 the evaporator 10 and the parts associated therewith may correspond to the evaporator 10 shown in Figs. 1, 2 and 3 and the same is applicable to the separator 11, the salt feeder 12, the saturator 14, the filter 15 and the heater 13 to which the salt-containing brine is directed by the pump 32; and like reference characters have been employed in designating the corresponding and associated parts of the apparatus as shown in Fig. 4. In Fig. 4 the outlet line 24 by which residual brine and crystallized salt are taken from the evaporator 10, instead of being directed directly to the separator 11, serves to introduce the residual brine and crystallized salt from the evaporator 10 into a second evaporator 10a. The circulatory system associated with the evaporator 10a is the same as that associated with evaporator 10 as described hereinabove (and have been indicated by like reference characters to which the letter "a" has been added); and the residual brine and crystallized salt are introduced into the circulatory system associated with the evaporator 10a in the manner above described for introducing clarified saturated brine into the evaporator 10.

In Fig. 4 it is the vapor from the evaporator 10a which is directed by the vapor line 49 to the condenser 16 rather than the vapor from the evaporator 10 as illustrated above in connection with Figs. 1 and 3. The controls for the condenser 16 in such case may be regulated for maintaining the vapor pressure prevailing in the evaporator 10a substantially below that prevailing in the evaporator 10 so that the temperature of the boiling brine in the evaporator 10a will be substantially lower than that of the boiling brine in the evaporator 10. In connection with the specific example hereinabove described, particularly with reference to Fig. 1, the vapor pressure within the evaporator 10 is maintained at substantially 10 inches of mercury absolute so that the brine within the evaporator 10 will boil at a temperature of 178° F., and such conditions may be maintained in the evaporator 10 of the embodiment shown in Fig. 4. In such case the vapor pressure prevailing in the evaporator 10a may be maintained at about 5 inches of mercury absolute by the condenser 16 so that the brine will boil in the evaporator 10a at a temperature of approximately 138° F.

Under such conditions additional salt will crystallize from the brine in the evaporator 10a and the residual brine and crystallized salt contained therein is permitted to become discharged from the evaporator 10a by the level controlled valve 23a and will pass by the line 24a to the separator 11. It is to be noted, however, that the brine which is taken to the separator 11 and which is separated from the purified crystallized salt will be at a temperature of about 138° F. rather than at a temperature of about 178° F. as is the case in connection with the example described hereinabove in connection with the embodiment of this invention shown in Fig. 1. However, since the amount of calcium sulphate that is dissolved in the brine at 220° F. in the saturator 14 is only about 60% of the amount required to produce saturation with respect to calcium sulphate at 138° F., and since on cooling from 220° F. to 138° F. the solution is concentrated only approximately 10% the residual solution is far from being saturated with respect to calcium sulphate and only sodium chloride will crystallize out in the evaporators.

When the cooled brine, as taken from the separator 11 with impure salt added thereto by the salt feeder 12, is directed to the heater 13 through the lines 31 and 33 under the influence of the pump 32, the brine entering the heater 13 will be at a temperature substantially below the condensing temperature of the vapor evolved in the evaporator 10. Accordingly, vapor evolved in the evaporator 10 can be directed by the line 50 to the heater 13 for direct contact with the cool brine in the heater 13 for condensation therein and for accomplishing a partial heating of the circulated brine. Since it is not possible to heat the circulated brine in the heater 13 to a temperature above the temperature prevailing in the evaporator 10 by condensation of vapor evolved in the evaporator 10 in direct contact therewith it is necessary to further heat the brine and this is accomplished in the heater 13a. In the embodiment shown, vapor is supplied to the heater 13a under high pressure from an outside source through the line 34 controlled by the valve 42 so as to pass through the jet compressor 47. For accomplishing further economy, part of the vapor evolved in the evaporator 10 can be commingled with the high pressure vapor supplied through the line 34 by directing a part of such vapor through the line 53 to the suction side of the jet compressor 47. In this way, vapor is supplied to the heater 13a at sufficient pressure so that its condensing temperature will be high enough to permit heating of the brine in the heater 13a to a temperature substantially above the temperature of the boiling brine in the evaporator 10. Any excess vapor will escape through the vent 35a. With further reference to the example hereinabove given, the brine may be heated in the heater 13a to a temperature of about 224° F. If steam is supplied through the line 34 at a pressure of about 200 pounds per square inch while maintaining the temperature and compression ranges as indicated in connection with the example given, the amount of steam supplied for producing a ton of salt will be approximately 1200 pounds. As above mentioned ordinarily, it is preferable to supply a sufficient amount of steam from an outside source to compensate for heat losses, but if lesser ranges for compression and temperature are desired, auxiliary heat may be supplied to offset the heat losses, as illustrated above in connection with Fig. 3. If the impure salt is added at such rate as to substantially completely saturate the brine leaving the saturator 14 a ton of salt per hour will separate out in the separator 11 for each 90 gallons per minute (approximately) of brine flowing through the valve 40.

In the embodiment shown in Fig. 4, the brine which is heated in the heater 13 is directed to the heater 13a by connecting the line 36 which constitutes the outlet for the heater 13 to the pump 32a which directs the brine and undissolved impure salt by the line 33a to the heater 13a. In order to prevent flooding of the heater 13a the by-pass line 41a may be employed which connects the outlet of the heater 13a to the suction side of the pump 32a under a hydrostatic head which is maintained for the purposes hereinabove described. The heated brine and the undissolved salt is directed from the heater 13a to the saturator 14 by the line 36a for saturation followed by filtration in the filter 15 before introduction of the brine into the evaporator 10 at a rate controlled by the control valve 40 in the line 39 in the manner that has been described in connection with the preceding figures.

In the embodiment shown in Fig. 4, it is not essential to employ the jet compressor 47 for the steam which is supplied to the heater 13a may be supplied solely from an outside source at any desired pressure. For example, the steam supplied to the heater 13a may be saturated steam at a gauge pressure of about 5 pounds per square inch. In such case, however, the further economies which can be afforded by the employment of the jet compressor are not realized.

Figure 5:
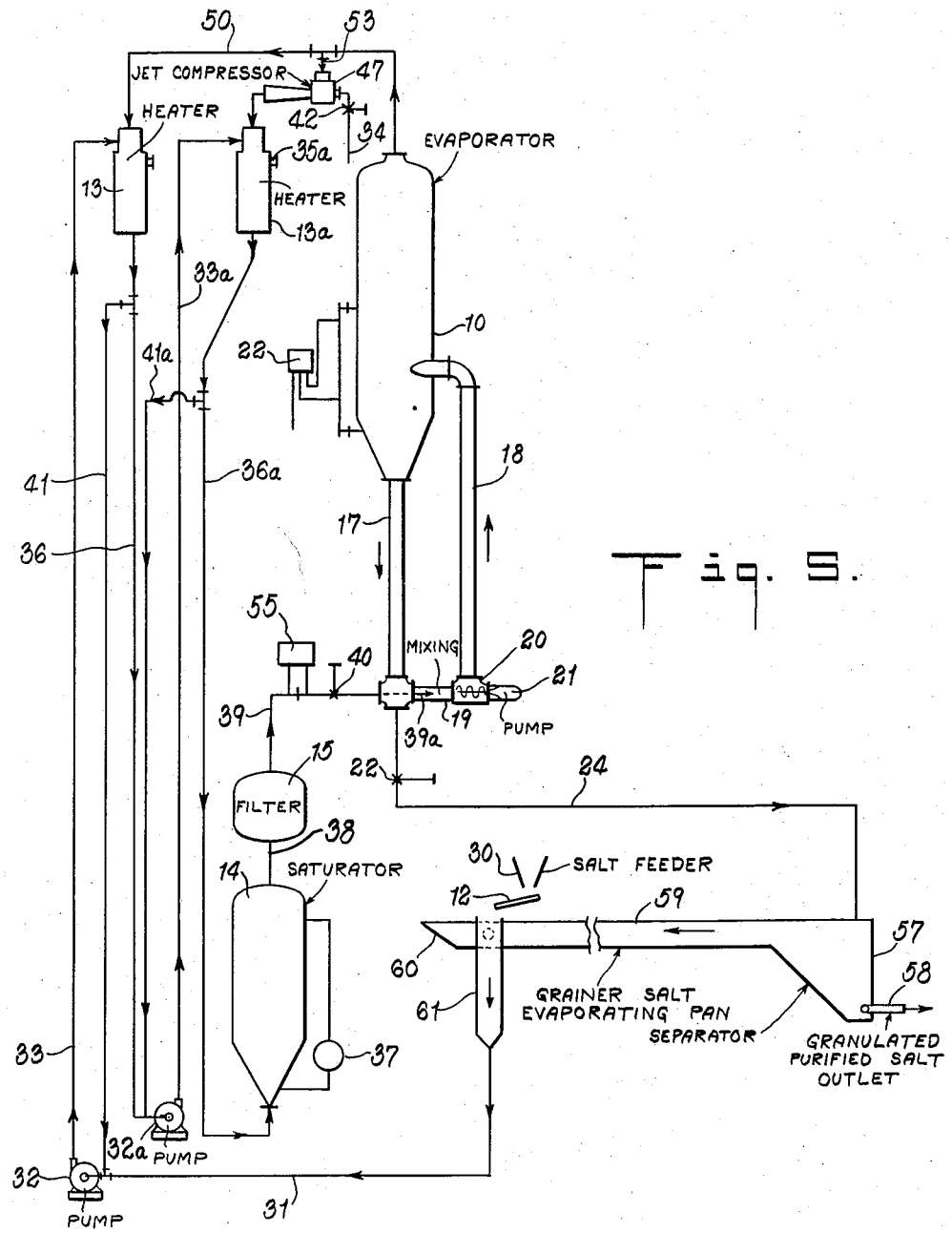
Fig. 5 is similar to Fig. 4 except one of the evaporators is in the form of a pan wherein salt of the grainer type may be produced.

In Fig. 5, a modification of the apparatus shown in Fig. 4 is illustrated wherein an open pan evaporator is used to accomplish further cooling and separation of purified salt in place of evaporator 10a, the resulting cooled brine being used to condense vapor produced in the evaporator 10. The elements of the apparatus shown in Fig. 5 that correspond with those shown in Fig. 4 have been indicated by like reference characters. According to the embodiment shown in Fig. 5, residual brine containing crystallized salt is removed from the evaporator 10 by the line 24 directly to a modified type of separator 57 which permits settling out of the cubical salt crystals produced in the evaporator 10 for removal at the outlet 58. The brine which is separated from the cubical or granulated crystals passes through the open pan 59 so that vapor is permitted to evaporate therefrom directly to the atmosphere. The gradual evaporation of the vapor from the brine solution in the pan 59 is accompanied by further cooling of the brine solution and further salt is separated out which is the type referred to hereinabove as grainer salt or flake salt. The salt produced in the pan 59 can be raked therefrom over the discharge end 60 and the clarified and cooled brine flows into the salt inlet tank 61 into which impure rock salt is fed by the salt feeder 12 from the hopper 30.

The cooled brine in the tank 61 will have been cooled to a temperature substantially below the temperature of the boiling brine in the evaporator 10 so that then the cooled brine is directed from the tank 61 by the lines 31 and 33 under the influence of the pump 32 to the heater 13, it will be at such temperature as to condense the vapors evolved in the evaporator 10 which are directed to the heater 13 by the line 50. In this manner, the brine will be partially heated in the heater 13 and the heating of the brine will be completed in the heater 13a in the manners hereinabove described in connection with Fig. 4.

If desired, additional evaporators may be installed operating on smaller pressure differentials between each evaporator than those hereinabove exemplified and utilizing additional heaters for successively heating the circulating brine to progressively higher temperatures and by so doing further economies in steam cost required per ton of purified salt produced may be afforded. Such an embodiment of this invention is shown in Fig. 6. In this figure the evaporator 10, the saturator 14, the filter 15, the heater 13, the separator 11 and the salt feeder 12, as well as the parts associated therewith may be the same as the corresponding parts hereinabove described in the preceding figures. As in the embodiment shown in Fig. 4, the residual brine and crystallized salt therein is directed from the evaporator 10 by the line 24 to the evaporator 10a under the influence of the level control valve 23 in the line 24. In the evaporator 10a the pressure is further reduced and the solution is boiled with production of further crystallized salt. The residual brine from evaporator 10a is taken from this evaporator by the line 24a under the control of the level controlled valve 23a contained therein to the evaporator 10b wherein the pressure is still further reduced with resultant boiling of the solution and crystallization of additional salt. The residual brine and crystallized salt is directed from the evaporator 10b by the line 24b under the control of the level controlled valve 23b contained therein to the evaporator 10c wherein the pressure is still further reduced to a pressure that is controlled by the condenser 16 to which the vapor from the evaporator 10c is directed by the line 62. The brine is further boiled in the evaporator 10c under the influence of the relatively low pressure prevailing therein with further crystallization of salt therefrom and the residual brine containing the crystallized salt is directed therefrom by the line 24c under the influence of the level controlled valve 23c contained therein to the separator 11 wherein the purified crystallized salt is separated from the residual brine for removal through the outlet 27.

As in the previously described embodiments, the clarified brine is taken from the separator 11 by the line 28 to the salt inlet tank 29 where it receives salt from the salt feeder 12 at a rate corresponding to the rate of dissolution and recovery of salt in the system. The brine taken from the tank 29 is at a temperature below the condensing temperature of the vapor evolved in the evaporator 10b so that when the brine is directed through the lines 31 and 33 to the heater 13 under the influence of the pump 32 the brine will be partially heated by condensation of vapor directed from the evaporator 10b to the heater 13 by the line 63. The partially heated brine is directed by the lines 36 and 33a to the heater 13a under the influence of the pump 32a and since the brine is at a temperature lower than the condensing temperature of the vapor evolved in the evaporator 10a the brine is further heated in the heater 13a by condensation in direct contact therewith of vapor evolved in the evaporator 10a and directed to the heater 13a by the line 64. The brine and impure salt contained therein is directed from the heater 13a by the lines 36a and 33b under the influence of the pump 32b to the heater 13b and since the brine at this stage is below the condensing temperature of the vapor evolved in the evaporator 10 the brine is further heated in the heater 13b by a portion of the vapor evolved in evaporator 10 which is directed to the heater 13b by the line 65. The circulating brine and salt is then brought to temperature substantially above the temperature of the brine boiling in the evaporator 10 by directing the brine and salt by the line 36b and line 33c under the influence of the pump 32c to the heater 13c. The brine and salt in the heater 13c may be heated by steam supplied from an outside source by the line 34 through the jet compressor 47 and may entrain on the low pressure side of the jet compressor 47 a portion of the vapor evolved in the evaporator 10 that is directed to the jet compressor 47 by the line 68. The steam supplied through the line 34 may, as in the previous examples, be supplied at a pressure of about 200 pounds per square inch and it is preferable to use the jet compressor in view of the added economy that can be obtained in this way. However, as above described, the jet compressor may be omitted and the steam may be supplied to the heater 13c solely from an outside source under any suitable pressure such as 5 pounds per square inch.

After the heating of the brine and salt carried therewith has been completed in the heater 13c the heated brine and salt may be directed by the line 36c to the saturator 14 wherein the dissolution of the salt is completed as described hereinabove so as to produce a substantially saturated solution. The saturated solution is then passed through the filter 15 and is directed into the evaporator 10 by the line 39 controlled by the valve 40 as has been hereinabove described.

It will be noted in connection with the embodiment shown in Fig. 6 that the pressures maintained in the evaporators 10, 10a and 10b are maintained by condensation of evolved vapor in direct contact with circulated brine which is at a lower temperature than the condensing temperature of the vapors evolved in the respective evaporators.

The vapor evolved in the evaporator 10c will correspond to the amount of steam added from the outside source through the line 34 and when the embodiment as shown in Fig. 6 is employed the quadruple effect system makes it possible to refine sodium chloride using as little as 800 pounds of steam per ton of purified salt produced.

In the embodiment shown in Fig. 6, it is desirable to maintain the heaters 13 and 13a at a reduced pressure so the vents 35 and 35a of these heaters are connected by line 69 to the jet evacuator 70.

While examples have been given hereinabove as regards typical operation and practice of this invention, especially in connection with exemplary pressure and temperature conditions and differentials, it is to be understood that this has been done primarily for illustrative purposes and that the temperatures and pressures as well as the differentials therebetween in the different zones in the system may be varied. However, in the purification of sodium chloride, involving the separation of calcium sulphate therefrom, the temperature prevailing in the saturating zone should be substantially above 176° F. inasmuch as the solubility of calcium sulphate in water solution saturated with respect to calcium sulphate and sodium chloride remains substantially constant at temperatures below 176° F., while its solubility decreases substantially upon rise in temperature above 176° F. Preferably the brine is heated to at least 220° F. for producing a saturated solution of impure salt, although it is also consistent with preferred practice when the brine is heated to a somewhat lower temperature of the order of at least about 210° F. Moreover, higher temperatures may likewise be employed as hereinabove indicated. For good yields in relation to the amount of brine recirculated a temperature differential of at least about 40° F. in the system either by one effect or over a plurality of effects is preferably employed, although by resort to the use of a supply of auxiliary heat such temperature differential may be reduced, e. g., to about 30° F.

In connection with Fig. 7 a modification of this invention is exemplified in connection with removal of salt from a solution by its electrochemical decomposition as distinguished from physical removal of crystallized salt from a salt-containing solution and many of the features and advantages of this invention which have been disclosed hereinabove are applicable to such modification while certain further features of this invention are concerned more especially therewith in connection with the processing of circulating brine used in chemical and electrochemical processes.

In Fig. 7 the method and apparatus of this invention are comprised in a system for the production of chlorine and a by-product such as sodium hydroxide that is derived from the sodium which is initially produced along with the chlorine as the result of the electrochemical decomposition of sodium chloride in the sodium chloride solution. A typical operation of this type is that wherein sodium chloride solution is subjected to electrochemical decomposition in a mercury cell. The mercury cell treatment is well known and, therefore, does not require detailed description herein. However, the reaction which occurs in the mercury cell may be briefly referred to as one wherein sodium chloride is subjected to electrochemical decomposition so as to break it up into its elements chlorine and sodium. The liberated chlorine gas is evolved and removed for collection in a known manner. The liberated sodium forms an amalgam with a moving blanket of mercury which carries the amalgam out of the cell. The sodium amalgam is thereafter contacted with water for reaction with the sodium to form sodium hydroxide thereby separating it from the mercury which is fed back into the cell.

In carrying out the mercury cell process it is important that the sodium chloride solution be fed into the cell in substantially saturated condition. The amount of sodium chloride which is removed from the solution in the cell may vary somewhat depending upon the particular operating conditions that prevail, but generally the amount of sodium chloride which is removed is not large and reduction of the sodium chloride solution from fully saturated condition to approximately 85% saturation at which the spent or residual solution is withdrawn from the cell is exemplary. The problem in such an operation is to restore the spent solution to substantial saturation for its reintroduction into the cell.

For economical operation of a cell such as a mercury cell the sodium chloride solution fed therein should contain a minimum content of impurities such as calcium, magnesium, iron and oxygen-containing acid radicals such as $SO_4$, $SO_3$ and $CO_3$. Calcium sulphate which is the principal impurity in ordinary rock salt is objectionable both because of its calcium content and its $SO_4$ radical. In using a source of sodium chloride such as rock salt it is particularly important to hold down the proportion of calcium sulphate contained in the solution fed into the cell. In order to prevent calcium from building up a soluble carbonate such as soda ash may be used to produce calcium carbonate which is precipitated and can be filtered out, but by such treatment sodium sulphate is produced which tends to build up excessively in the circulated solution. In order to cope with the accumulation of sodium sulphate a soluble salt of barium may be used for the purpose of precipitating barium sulphate which can be filtered out. However, treatment with barium involves considerable expense because of material cost and it is substantially as economical to purge from the system spent sodium chloride solution withdrawn from the cell in very considerable quantities sufficient to prevent buildup of sulphate in the solution circulated through the cell. Impurities such as magnesium and iron can be removed by adding sodium hydroxide for effecting precipitation of the relatively insoluble hydroxides of these metals. While such chemical treatment and filtering out of precipitated impurities is possible the amount and cost of treating chemicals required is substantial.

The present invention provides new method and means for preventing buildup of impurities in a circulated brine used in an operation such as electrochemical decomposition of sodium chloride which can readily be practiced and controlled and which when used in connection with chemical treating agents enables the amounts of the chemical treating agents to be greatly reduced thus effecting very substantial savings.

For purposes of illustration the improved method and apparatus of this invention for removing impurities contained in solid impure sodium chloride while at the same time restoring the sodium chloride content of spent brine withdrawn from a mercury cell or the like has been shown as comprising the type of unit shown in Fig. 4 which has been described in detail hereinabove, and the corresponding elements of Fig. 7 have been designated by the same reference characters appearing in Fig. 4. The principal elements of this unit are the salt feeder 12 for feeding solid impure sodium chloride, the mixing or salt feeding tank 29, the heaters 13 and 13a, the saturator 14, the filter 15 and the evaporators 10 and 10a. In Fig. 7 a settler tank 71 has been shown in the line 38 leading from saturator 14 to the filter 15 which can be used to collect at least in part some of the impurities such as undissolved calcium sulphate, dirt and the like and thereby take a part of the load off the filter 15. Sludge collected in the settler 71 can be removed when desired through the draw-off line 72 which is controlled by the valve 73. The settler 71 is not essential and may be omitted. On the other hand a settler such as the settler 71 may be employed, if desired, in any of the systems shown in Figs. 1 to 6. For purposes of simplicity in the showing the jet compressor 47 shown in Fig. 4 has been omitted in Fig. 7 but advantageously can be employed if desired.

Fig. 7 differs from Fig. 4 primarily by the fact that instead of employing the separator 11 of Fig. 4 by which crystallized salt is physically removed from the salt-containing solution withdrawn from evaporator 13a, other means comprising the cell 74 is shown whereby salt is removed from salt-containing solution withdrawn from the evaporator 10a by electrochemical decomposition of the salt.

While all of the spent sodium chloride solution withdrawn from the cell 74 may be passed through the means for adding impure salt and removing impurities therefrom it is a feature of preferred practice of this invention that only part of spent sodium chloride solution withdrawn from the cell 74 be so treated. Fig. 7 illustrates how this invention may be practiced in either of these ways.

The spent sodium chloride solution is withdrawn from cell 74 by the line 75 by which the spent solution is directed into the vessel 76 into which acid such as hydrochloric acid may also be fed by the line 77 controlled by the valve 78 whereby the spent brine may be acidified in the vessel 76. The acidified brine is directed by the line 79 controlled by the valve 80 to the stripper 81 which is of any conventional type adapted for stripping chlorine from the acidified solution as by passage of air therethrough. From the stripper 81 the solution is fed into the salt inlet tank 29 by the line 82 which is controlled by the valve 83. For the purpose of neutralizing the acidity of the brine and preferably imparting substantial alkalinity thereto before the brine is fed into the salt inlet tank 29 a solution of an alkaline compound of sodium, ordinarily sodium hydroxide, is fed into the line 82 by the alkali feed line 84 which is controlled by the valve 85.

The salt-containing solution is withdrawn from the evaporator 10a by the line 24a and by this line and the line 86 which is controlled by the valve 87 it is directed into the cell supply tank or vessel 88 which, as will be described more in detail below according to preferred practice of this invention, also may serve as a mixing tank. The sodium chloride solution is fed into the cell 74 from the cell supply vessel 88 by the line 99.

When only part of the spent brine withdrawn from the cell 74 is treated for the addition of impure salt and removal of impurities, the balance of spent solution is directed by the by-pass line 90 which is controlled by the valve 91 from line 75 to line 24a so as to be commingled with the salt-containing solution in the line 24a and carried therewith into the cell supply tank 88. Preferably there is a cooler 92 in line 90 for cooling solution passing through the line 90 by out-of-contact heat exchange with a cooling fluid which may be fed through the cooler 93 by the inlet and outlet lines 94 and 95 respectively.

When in accordance with preferred practice of this invention only part of the spent solution withdrawn from the cell 74 is treated for the addition of impure solid salt and removal of impurities there necessarily is production of crystallized salt in evaporators 10 and 10a in sufficient amount so that when unsaturated spent solution is taken to the cell supply vessel 88 by the line 90 the crystallized salt will dissolve therein and provide a saturated solution in the vessel 88. On the other hand the portion of spent solution withdrawn from the cell 74 and subjected to the salt adding and impurity removal treatment should be sufficient in amount so that this portion together with steam condensed therein in heating it will permit dissolution of an amount of impure salt corresponding to that removed from the saturated solution in its passage through the cell 74 whereby the solution returned to the cell may be restored to saurtated condition. To effect this result it constitutes preferred practice of this invention to split the spent solution withdrawn from the cell room roughly in half, so that about 50% thereof is treated for salt addition and impurity removal and the other 50% is by-passed through the line 90. In such case the treated portion can conveniently be brought substantially to saturated condition in the saturator and sodium chloride will be precipitated in the evaporators 10 and 10a in substantially that amount required to resaturate the 50% of spent solution that is by-passed through the line 90. A typical example of an operation of this type will now be described.

In typical operation of a mercury cell a solution which is substantially saturated with respect to sodium chloride is fed into the cell 74 at a temperature that is preferably below 130° F., e. g. about 122° F. Due to the action within the cell the temperature of the solution becomes raised so that it is withdrawn at about 158° F. Within the cell sodium chloride is subjected to electrochemical decomposition with resultant formation of chlorine and sodium which are continuously removed from the cell as aforesaid. The salt solution that is withdrawn from the cell is about 85% saturated with respect to sodium chloride. While the particular temperature and pressure conditions selected affect the quantitative requirements applicable in connection with the supply of the saturated solution to the mercury cell in the practice of this invention, the following is illustrative of a typical operation adapted for the recovery of about 30 tons of chlorine per twenty-four hour period while maintaining the foregoing typical conditions of all operations. The salt solution is withdrawn from the cell at a rate such that it will contain about 1576 pounds of water per minute. Of this slightly less than half of this solution, namely 760 pounds of water per minute, is directed into the vessel 76 into which is fed an amount of hydrochloric acid sufficient to impart to the solution a pH of about 3.0 for the purpose of facilitating the stripping of dissolved chlorine from the solution in the stripper 81. After leaving the stripper 81 a solution of sodium hydroxide is fed in through the line 84 sufficient to impart to the solution a pH of about 10.8 as it is fed into the mixing or salt feeding tank 29 at a temperature of about 154° F.

Since the solution which is fed into the cell at the rate corresponding to about 1585 pounds of water per minute is substantially saturated with sodium chloride this represents the introduction of sodium chloride into the cell at the rate of about 581 pounds per minute. And since the spent solution withdrawn from the cell 74 is about 85% saturated, sodium chloride will be withdrawn in the withdrawn solution at the rate of about 505 pounds per minute. In other words about 76 pounds per minute of sodium chloride is removed from the solution by the electrochemical decomposition thereof in the cell 74. An amount of solid impure sodium chloride is fed into the salt feeding tank 29 which will yield an equivalent amount of sodium chloride, namely, about 76 pounds per minute, although in practice according to the instant example sufficient solid sodium chloride is maintained in the system to keep a bed of solid sodium chloride in the saturator 14, and the feed of solid impure sodium chloride into the tank 29 is controlled so as to maintain the amount of sodium chloride in the saturator 14 substantially constant. Supply of sodium chloride at an average rate corresponding to that above mentioned will serve this purpose.

After the addition of the solid impure sodium chloride to the tank 29 the resulting slurry is subjected to the treating steps that have been described hereinabove in connection with the system shown in Fig. 4. Thus, the slurry is partially heated in the heater 13 by condensation therein of steam evolved in evaporator 10 and is further heated to about 224° F. as by admission of steam from an outside source through the line 34 under a pressure greater than atmospheric and at the rate of about 1800 pounds per hour. The heated slurry is then passed through the saturator 14 wherein it becomes saturated with respect to the sodium chloride at a temperature of about 218° F. Insoluble material, such as undissolved calcium sulphate, magnesium hydroxide, iron hydroxide and dirt, that passes out of the saturator is removed in the settler 71 and the filter 15 from which the clarified solution passes at a temperature of about 214° F. to the evaporator 10 wherein the pressure becomes reduced to a pressure at which the solution boils at a temperature of about 186° F. with simultaneous production of crystallized sodium chloride. Further sodium chloride is precipitated in the evaporator 10a wherein the pressure is further reduced by the action of the condenser 16 to such pressure that the solution boils at a temperature of about 122° F. The resulting salt-containing solution or slurry is then withdrawn from the evaporator 10a and by the lines 24a and 86 is directed into the cell supply vessel 88. This withdrawn salt-containing solution is at a temperature of about 122° F. and is at the rate of about 736 pounds of water per minute and 319 pounds of salt per minute.

The balance of the solution withdrawn from the cell 74 by the by-pass line 90 corresponds to about 816 pounds of water per minute and about 261 pounds of salt per minute and it is preferably cooled to a temperature of about 122° F. by the cooler 92. In the cell supply vessel 88 this withdrawn solution, which is unsaturated with respect to sodium chloride, is substantially that which will accomplish redissolution of the precipitated sodium chloride carried into the vessel 88 from the evaporator 10a, and the resulting saturated solution is fed back into the cell 74 by the line 89 and corresponds in total to about 1585 pounds of water per minute and about 581 pounds of sodium chloride per minute.

Since there is a slight loss of water in carrying out the operation, any desired amount of make-up water can be fed into the system at any appropriate point such as by the line 96 controlled by the valve 97. In connection with the foregoing example a supply of make-up water at the rate of about 32 pounds per minute should be suitable.

Before the solution is fed into the cell 74 it is desirable to remove alkalinity and this can be accomplished at any appropriate point following the evaporator 10a. As illustrated in Fig. 7, hydrochloric acid may be fed into the line 24a for this purpose by the acid feed line 98 controlled by the valve 99. The amount of acid which is added preferably is that which restores the solution to substantially acidity.

In carrying out the operation according to the foregoing example, the calcium sulphate contained in the source of solid impure salt never goes into solution once operating conditions have become established in the system and merely remains in the settler 71 or filter 15. The solution circulated through the system will contain about 2.5 to 2.7 grams per liter of calcium sulphate but such amount of calcium sulphate is well within the amount that can be tolerated in satisfactory operation of the cell, and it is a decided advantage that according to this invention the proportion of calcium sulphate is effectively prevented from building up without employing such expedients as by adding a carbonate to precipitate calcium carbonate or by adding a soluble compound of barium to precipitate barium sulphate or by passing to waste a relatively large proportion of spent solution withdrawn from the cell. When the solution is rendered alkaline as above described any other impurities such as magnesium and iron which form relatively insoluble hydroxides are likewise removed by the settler 71 or the filter 15, thus holding down any such impurities to virtually only a trace. When the spent solution is acidified with hydrochloric acid and then rendered alkaline by incorporation of sodium hydroxide a small amount of calcium chloride such as .4 to .7 gram per liter may be contained in the circulated brine. If desired this small amount of calcium chloride may be reduced by incorporating a small proportion of a soluble carbonate such as soda ash along with the sodium hydroxide thus causing calcium chloride to precipitate out as calcium carbonate which is removed by the settler 71 or filter 15.

While mention has been made of stripping chlorine from spent solution withdrawn from the cell 76 after preliminary acidification of the spent cell solution by blowing air therethrough, other chlorine removing expedients can be resorted to such as flash cooling in a vacuum in which case preliminary acidification may not be necessary. Likewise while it is preferable to render the spent cell solution alkaline by addition of sodium hydroxide thereto prior to clarification of the solution in the settler 71 or filter 15, the solution may be passed through the purification treating steps in a substantially neutral condition if it is not desired or it is unnecessary to remove impurities such as magnesium or iron which form substantially insoluble hydroxides. In such case the subsequent treatment of the solution with hydrochloric acid to restore acidity may not be necessary. However, it is normally preferred to add sodium hydroxide so as to impart to the solution as it passes through the settler 71 and filter 15 a pH of 10 to 11.

If desired in connection with the system shown in Fig. 7, all of the spent solution withdrawn from the cell 74 may be subjected to the salt addition and impurity removal steps and to shut off or omit the by-pass line 90. For affording a specific example of this type of operation, the same amount of spent solution corresponding to about 1576 pounds of water per minute may be directed in its entirety through the stripper 81 and into the salt feeding tank 29 so as to enter the tank 29 at a temperature of about 154° F. The steps respecting acidification and alkali addition may be carried out in the same manner as above described. Impure sodium chloride is also fed into the tank as before at the rate of about 76 pounds per minute so as to make up for the corresponding amount of sodium chloride removed by electrochemical decomposition in the cell 74. In such case the temperatures and pressures prevailing in the heaters 13 and 13a and in the evaporators 10 and 10a may be the same as those mentioned in connection with the preceding example but since all of the spent cell solution withdrawn from the cell 74 is circulated through these units there will be no formation of crystallized sodium chloride in either of the evaporators 10 or 10a and the solution which is withdrawn from the evaporator 10a will be substantially saturated with respect to sodium chloride at 122° F. This solution is, therefore, adapted to be returned directly to the cell 74. However, when necessary, it may be rendered acid by introduction of hydrochloric acid introduced by the line 98 as mentioned in connection with the preceding example. Moreover, make-up liquid in this type of operation is preferably fed into the system as the salt solution enters the evaporator 10a by means of the line 100 controlled by the valve 101 which feeds the make-up water into the line 18a. According to the instant example introduction of make-up water in this manner at the rate of about 55 pounds per minute has been found to be suitable. By introduction of the make-up water at this point any crystallization of sodium chloride in evaporator 10a is prevented and this is preferable as compared to the introduction of the make-up water at a later point for the purpose of dissolving any small amount of sodium chloride that might otherwise form in the evaporator 10a. Under the conditions given salt solution corresponding to about 1585 pounds of water per minute and about 580 pounds of salt per minute will be returned to the cell 74 at a temperature of about 122° F.

The operation according to the last-given example wherein all of the spent solution is circulated through the salt-adding and impurity-removal steps accomplishes essentially the same effective purification as that accomplished when only about half of the spent solution is so circulated, but it has certain practical disadvantages. Thus, the capacity of the various units has to be doubled in order to effectively handle the doubled volume of circulated solution. Moreover, in order to accomplish the heating for obtaining the desired temperatures, an increased amount of heating steam has to be utilized. Thus, according to the second example, about 3640 pounds per hour of steam is required as compared with the above-mentioned amount of 1800 pounds per hour of steam at the same pressure which is required according to the first example. When treating chemicals are employed, it is also necessary to employ substantially twice the amount thereof in order to impart desired pH values at the different points in the cycle and the cost for treating chemicals is therefore doubled. It is apparent, therefore, that by the expedient of subjecting only a portion of the spent solution withdrawn from the cell 74 to the salt-adding and impurity-separation steps, substantial savings in equipment and cost for supplied heat can be realized as well as substantial savings in connection with such treating chemicals as may be employed. While two examples have been set forth wherein approximately half or all, respectively, of the spent cell solution is circulated through the salt-adding and impurity-removal steps, any intermediate proportion may be so circulated and in such case the amount of precipitated sodium chloride that is produced by the evaporation will vary with the amount of spent solution that is bypassed and which must be returned to saturated condition by dissolution of solid purified salt therein. In order to effect the required dissolution of added salt, it is desirable that at least nearly half of the spent cell solution be circulated through the salt adding and heating steps. In connection with either of the examples given, the amount of steam condensed in condenser 16 and removed as condensate from the system, is ordinarily approximately the same as the amount of steam from an outside source that is used in the heating step, but since the amount of heating steam which is required according to the second example is greater than that required for the first example, the amount of steam condensed in the condenser 16 and withdrawn as condensate from the system is correspondingly greater.

While the practice of this invention has been illustrated and described in connection with the system shown in Fig. 7, which utilizes the salt-adding and impurity-removal method and apparatus which have been described and shown in connection with Fig. 4, it is apparent that the cell portion of the system, shown in Fig. 7, can likewise be utilized in connection with the salt-adding and impurity-separation method and apparatus exemplified in any of Figs. 1, 2, 3, 5 and 6. Moreover, it is apparent that any of the systems described and illustrated in connection with Figs. 1 to 6 can be used for producing sodium chloride of high purity which can be used to fortify spent solution withdrawn from a mercury cell or the like for return to the cell in substantially saturated condition. In such case, all that is required is to contact the withdrawn spent solution with the so-produced purified sodium chloride in order to produce resaturation of the brine for return to the cell and to cool the brine so that it will be returned to the cell at the desired temperature which preferably is around 130° F. or below. Because of the purity of so-produced salt, special chemical treatments of the brine circulated through the cell can be dispensed with, but if it is desired to prevent build-up of impurities over relatively long periods of operation, then such impurities can be continuously removed by subjecting only a very small proportion, e. g. about 10%, of the spent cell solution to operations such as those above mentioned, including stripping of chlorine and use of alkali to precipitate compounds of magnesium, iron. Also by chemical treatment with a soluble carbonate and a soluble compound of barium, the amount of calcium sulphate circulated through the cell can be readily maintained at a very low value such as .001 gram per liter, while utilizing only small quantities of treating chemicals. In such case, material in solution in the brine passed through the cell will be substantially 99.998% sodium chloride with the small amount of calcium sulphate mentioned and only traces of other impurities. Alternatively, any such impurities which are only trivial in the case of the purified salt produced as above described can be prevented from accumulating by passing to waste an amount of the spent brine withdrawn from the cell which is relatively very small as compared with the amount of brine that would have to be passed to waste if the salt that is added to the spent brine had not been previously purified according to this invention.

In connection with operations such as those above described, it is ordinarily preferable that the solution in the mercury cell or treating zone shall not attain a temperature higher than about 180° F. and the solution fed into the treating zone is normally at a temperature substantially lower than the temperature of the spent solution that is withdrawn from the treating zone, this temperature differential ordinarily being at least about 25° F. The steps of salt addition and impurity removal of this invention are well adapted to such operating conditions for after the heated and salt enriched spent solution has been clarified, subsequent boiling and separation of vapor therefrom with attendant lowering of temperature enable the resulting salt-containing solution to be readily brought to a temperature below that prevailing in the treating zone and to an even lower temperature appropriate for being fed into the treating zone. When only part of the spent solution withdrawn from the treating zone is passed through the salt adding and impurity removal steps, then it is normally desirable to cool the balance of the spent solution that is mixed with purified salt-containing solutions, although, depending on the circumstances, such cooling of the by-passed portion of spent solution is not necessary if the portion of the spent solution to which salt has been added and from which impurities have been removed has been cooled to a sufficiently low temperature as the result of such treatment. While it is evidently preferable that the temperature of the solution in the mercury cell or other treating zone not go above about 180° F., the temperature of the solution may run higher in the treating zone, but in such case the temperatures in the heater and evaporator portions of the system may run higher than those exemplified hereinabove.

More generally, with reference to the foregoing, while certain of the features and advantages of this invention pertain to improved method and apparatus whereby a salt such as sodium chloride is precipitated in pure form and is physically removed and recovered in such condition and while certain other features and advantages of this invention pertain to the improved method and apparatus whereby impurities are removed from a salt such as sodium chloride that is added to a spent solution after removal of salt from the solution by electrochemical decomposition and prior to its return to the treating cell, there are features and advantages of this invention which are common to both types of operation, i. e., whether salt is separated from a salt-containing solution by physical removal of crystallized salt comprised therein or is separated by subjecting salt comprised in the salt-containing solution to electrochemical decomposition or other chemical or electrochemical step whereby salt is removed from a salt-containing solution. Thus, where reference is made in the claims to separation of salt from a salt-containing solution or to separating means for effecting such separation, the separation, unless more specifically defined, is to be understood as comprising either physical removal of solid salt or removal by electrochemical decomposition. Moreover, such separation step or means is to be understood as comprising separation of salt from salt-containing solution either in the form as it is withdrawn from the evaporator, or as modified by the incorporation of some other material therewith as, for example, when additional unsaturated solution or some additional solvent is added so as to redissolve any crystallized salt comprised in the salt-containing solution so as to place the salt-containing solution in better form for electrochemical decomposition of salt comprised therein as distinguished from physical removal and recovery of the crystallized salt.

Although this invention has been specifically described and illustrated in connection with the purification of sodium chloride, it is also applicable in connection with the purification or removal of impurities from other salts or substances that have increased solubility in water or other solvent upon increase in temperature in accomplishing its successive solution, impurity separation and subsequent concentration or crystallization with impurities removed therefrom and the invention is of especial value in the case of removing an impurity having inverse solubility in the solvent upon change in temperature. Accordingly, the terms salt, brine and solution as used in the claims comprehend soluble substances including salts other than sodium chloride and solutions in solvents other than water, as well as sodium chloride and sodium chloride dissolved in water.

It is apparent from the foregoing that this invention affords an improved method and apparatus for accomplishing removal of impurities from impure salts, as has been illustrated above in connection with the removal of impurities from a salt such as sodium chloride. The equipment cost is low and the process is very economical as compared with prior processes. Thus, in prior processes for producing sodium chloride of medium purity according to conventional prior practice using vacuum evaporators the input of energy as expressed in pounds of steam supplied is approximately 6500 pounds per ton of sodium chloride produced in the case of a single effect, approximately 2600 pounds per ton of sodium chloride produced in the case of a triple effect and approximately 2000 pounds per ton of sodium chloride produced in the case of a quadruple effect. As above indicated, such energy input can be more than cut in half for a similar number of effects according to the practice of this invention. Moreover, sodium chloride of extremely high purity will be produced and recovered without resort to the expense incident to chemical or physico-chemical treatment of the type considered essential according to prior practice. When this invention is utilized in the supply of salt to a brine solution fed into a treating zone such as a cell wherein the solution is subjected to electrochemical decomposition, impurities contained in the added salt can be effectively removed either without use of any treating chemicals or, if with the further employment of treating chemicals, at a cost for treating chemicals that is only a small fraction as compared with operations of this type as previously practiced. In addition, the system in any case can be carried out for protracted periods without the necessity for the frequent shutdowns for cleaning that have been an undesirable incident in the employment of prior conventional systems.

We claim:

1. A method of treating solid impure sodium chloride which comprises incorporating solid impure sodium chloride in an aqueous solution of sodium chloride in a salt mixing zone, directing said solution containing said solid impure sodium chloride from said salt mixing zone to a heating zone and into direct contact with steam in said heating zone thereby heating said solution and said solid impure sodium chloride incorporated therein to a temperature of at least about 210° F. with attendant addition thereto of condensate resulting from the condensation of said steam, continuing contact between said solid impure sodium chloride and said solution in a dissolution zone with production of a solution substantially saturated with sodium chloride, separating the resulting substantially saturated solution from any solid material contained therein in a clarifying zone by filtering while said solution is at said temperature of at least about 210°

F. to produce a clarified solution, directing the clarified solution into a solution mixing zone, circulating sodium chloride solution from said solution mixing zone to an evaporation zone maintained at a pressure substantially lower than that prevailing in said solution mixing zone and back to said solution mixing zone, boiling said solution in said evaporation zone with separation of vapor therefrom and lowering of the temperature thereof and with simultaneous production of crystallized sodium chloride in said evaporation zone, withdrawing residual solution and crystallized sodium chloride contained therein from said evaporation zone, separating from said withdrawn solution part of the sodium chloride contained therein leaving residual sodium chloride solution and including residual sodium chloride solution from which said sodium chloride has been separated in said sodium chloride solution in which said solid impure sodium chloride is incorporated as aforesaid.

2. A method according to claim 1 wherein sodium chloride is separated from the solution withdrawn from said evaporation zone by steps comprising first dissolving the crystallized sodium chloride contained therein by mixing therewith in a mixing zone an unsaturated solution of sodium chloride and subjecting the resulting solution in a treating zone to electrochemical decomposition with production of sodium and chlorine and removal of the unsaturated sodium and chlorine leaving residual sodium chloride solution.

3. A method according to claim 1 wherein said boiling of the clarified solution of sodium chloride takes place in a plurality of stages at successively lower temperatures and pressures, wherein said heating of said solution and of the solid impure salt incorporated therein is partially effected by condensation in direct contact therewith of steam evolved in at least one of said stages prior to the final boiling stage carried out at the lowest temperature and pressure and is further effected by condensation therein of steam supplied from an outside source to said temperature of at least about 210° F., and wherein steam corresponding approximately in amount to that supplied from said outside source and comprising that evolved in said boiling stage carried out at the lowest temperature and pressure is condensed and removed as condensate from the system.

4. A method of treating solid impure sodium chloride which comprises heating a solution of sodium chloride to a temperature of at least about 210° F. by condensation in direct contact with said solution of steam supplied in part from an outside source with attendant addition of water thereto, contacting said solution while heated to a temperature of at least about 210° F. with solid impure sodium chloride to dissolve sodium chloride therein, then separating undissolved material from the solution while it is at a temperature of at least about 210° F., thereafter reducing the pressure to which said solution is subjected to a pressure at which said solution boils at a temperature lower than the temperature of said solution at which said solid impure sodium chloride was dissolved therein to separate steam therefrom in an amount which at least approximately corresponds to the amount of steam condensed in said solution during the aforesaid heating step leaving residual solution containing sodium chloride, thereafter separating from the residual solution part of the sodium chloride contained therein leaving sodium chloride solution, including sodium chloride solution resulting from the salt separation step in the solution of sodium chloride subjected to the aforesaid heating step, condensing said steam separated from said solution partly in direct contact with said solution in effecting said heating thereof and partly out of contact with said solution and removing from the system an amount of the resulting condensate condensed out of contact with said solution corresponding to the amount of steam supplied from said outside source.

5. In a method of treating solid impure sodium chloride comprising calcium sulphate as an impurity to separate calcium sulphate impurity from sodium chloride comprised in said solid impure sodium chloride wherein the sodium chloride is dissolved in water to form an aqueous solution thereof at a temperature above 176° F. leaving calcium sulfate undissolved, the undissolved calcium sulfate is separated from the solution while the solution is at a temperature above 176° F. with resultant clarification of the solution, and sodium chloride thereafter is removed from the clarified solution, the steps comprising incorporating in a salt mixing zone solid impure sodium chloride with an aqueous solution of sodium chloride to form a mixture of said solid impure sodium chloride and said solution wherein the amount of solid sodium chloride is in excess of that soluble in said solution at the mixing temperature, directing said mixture from said salt mixing zone to a heating zone, heating said mixture in said heating zone to a temperature substantially above 176° F. by direct contact with steam which condenses therein thereby simultaneously heating said solid impure sodium chloride and said solution with attendant addition of the condensate resulting from the condensation of said steam, effecting while the resulting mixture is at a temperature substantially above 176° F. dissolution therein of sodium chloride comprised in said solid impure sodium chloride leaving calcium sulphate comprised in said solid impure sodium chloride undissolved, and separating insoluble material including undissolved calcium sulphate from the resulting solution while it is at a temperature substantially above 176° F.

6. A method of treating solid impure sodium chloride according to claim 5 wherein after the incorporation of the solid impure salt in the aqueous solution of sodium chloride in said salt mixing zone the resulting mixture is impelled by means of a pump from said salt mixing zone to said heating zone against hydrostatic back pressure imposed by disposition of said heating zone above said pump, and wherein a substantial portion of said mixture is recycled from said heating zone to the inlet side of said pump for contact with unheated mixture directed to said pump from said salt mixing zone while said recycled portion of said mixture is under a hydrostatic head of approximately 1.5 foot per degree temperature differential Fahrenheit between the temperature of said mixture in said salt mixing zone and the temperature to which the mixture is heated in said heating zone.

7. A method of producing crystallized sodium chloride which comprises boiling a solution of sodium chloride with attendant crystallization of sodium chloride in an evaporation zone, maintaining circulation of residual solution and crystallized sodium chloride downwardly from said evaporation zone to a solution mixing zone maintained under a hydrostatic head and back to said evaporation zone by a separate path for introduction into said evaporation zone below the liquid level of solution boiling therein, directing a substantially saturated solution of sodium chloride from a source maintained at a temperature and pressure substantially higher respectively than the temperature and pressure prevailing in said evaporation zone into said solution mixing zone, mixing said solution supplied from said source in said solution mixing zone with said residual solution and said crystallized sodium chloride for entrainment with the residual solution and crystallized sodium chloride circulated back to said evaporation zone, the pressure in said mixing zone resulting from said hydrostatic head being at least that corresponding to about one-half foot per degree temperature differential Fahrenheit between the temperature of the solution in said evaporation zone and the temperature of said solution as supplied to said solution mixing zone from said source, and removing crystallized sodium chloride and residual solution from said evaporation zone.

8. A method of separating calcium sulphate contained in impure solid sodium chloride from sodium chloride contained therein, said process comprising contacting said solid impure sodium chloride with an aqueous sodium chloride solution at an elevated temperature substantially above 176° F. which is unsaturated with respect to sodium chloride and is substantially saturated with respect to calcium sulphate to dissolve sodium chloride therein leaving in undissolved condition calcium sulphate contained in said impure sodium chloride, separating undissolved material comprising said calcium sulphate and any undissolved sodium chloride from the resulting solution while said solution is at an elevated temperature substantially above 176° F., directing the resulting clarified solution into a first evaporation zone with attendant lowering of pressure to a pressure at which said solution boils at a temperature substantially below that prevailing during the separation step and separating steam from said solution by boiling same in said first evaporation zone at said pressure, directing residual solution from said first evaporation zone to a second evaporation zone with attendant lowering of pressure to a pressure at which the residual solution boils at a temperature substantially below that prevailing in said first evaporation zone and separating steam therefrom by boiling same in said second evaporation zone at said pressure, withdrawing residual sodium chloride-containing solution from said second evaporation zone, partially heating to said elevated temperature said solution of sodium chloride contacted with said solid impure sodium chloride as aforesaid by directing into direct contact therewith in a first heating zone steam separated from solution in said first evaporation zone with condensation of said steam therein, transferring said partially heated solution to a second heating zone, and further heating said solution in said second heating zone to said elevated temperature by directing into direct contact therewith steam at a pressure substantially higher than that prevailing in said first evaporation zone at which said steam condenses therein, the resulting so-heated solution being contacted with said solid impure sodium chloride as aforesaid.

9. A process which comprises removing an unsaturated solution of sodium chloride from a zone maintained at a temperature not substantially above 180° F., adding hydrochloric acid to the sodium chloride solution removed from said zone, stripping chlorine from the acidified solution, dissolving an alkaline compound of sodium in said solution from which chlorine has been stripped to impart alkalinity thereto, heating said solution to a temperature of at least about 210° F. by direct contact with steam which condenses therein to form a mixture of said solution and the steam condensate, contacting impure solid sodium chloride with said mixture while it is at a temperature of at least about 210° F. to dissolve additional sodium chloride therein, thereafter separating insoluble material from said solution while at a temperature of at least about 210° F. to provide a clarified solution, and boiling the clarified solution to separate vapor therefrom including boiling while under a pressure at which said solution boils at a temperature which is below that prevailing in said zone, and returning the remaining solution and the sodium chloride contained therein to said zone.

10. A process which comprises removing unsaturated sodium chloride solution from a zone, heating a first portion of said withdrawn sodium chloride solution to a temperature of at least about 210° F. by direct contact with steam which condenses therein to form a mixture of the condensed steam with said portion of said withdrawn sodium chloride solution, contacting said heated mixture with impure solid sodium chloride to dissolve additional sodium chloride therein while at a temperature of at least about 210° F., thereafter separating insoluble material from the resulting solution while it is at a temperature of at least about 210° F. to provide clarified solution, boiling the clarified solution while under a pressure at which said solution boils at a temperature which is substantially below that prevailing in the clarification step to separate vapor therefrom with simultaneous production of crystallized sodium chloride, mixing the resulting sodium chloride solution containing the crystallized salt with a second portion of sodium chloride solution withdrawn from said zone with dissolution of the crystallized sodium chloride to form a solution wherein substantially all of the sodium chloride is in dissolved condition, and feeding said solution into said zone.

11. Apparatus of the character described for treating a salt which comprises a container adapted to contain a solvent for said salt, means for feeding solid salt into said container, a heater chamber, means for directing solvent and solid salt commingled therewith from said container to said heater chamber, means for directing vapor to said heater chamber and into direct contact with solvent within said heater chamber, a saturator chamber, means for directing solvent and solid salt commingled therewith from said heater chamber to said saturator chamber for dissolution of salt in the solvent, clarifier means adapted to separate solid material from a liquid, means for directing solution from said saturator chamber to said clarifier means, an evaporator chamber, a solution mixing chamber located substantially below said evaporator chamber, a first line communicating between said evaporator chamber and said solution mixing chamber, a second line communicating between said evaporator chamber and said solution mixing chamber, means for circulating solution from said evaporator chamber to said solution mixing chamber through said first line and from said solution mixing chamber back to said evaporator chamber through said second line, means for directing clarified solution from said clarifier means into said solution mixing chamber, means for effecting separation of vapor from solution in said evaporator chamber and for removing separated vapor from said evaporator chamber, salt-removing means adapted to remove salt from a salt-containing solution, means for directing solution from said evaporator chamber to said salt-removing means, and means for directing solution from which salt has been removing by said salt removal means from said salt removing means to said container.

12. Apparatus according to claim 11 which comprises a second evaporator chamber, a second solution mixing chamber disposed substantially below said second evaporator chamber, a first line communicating between said second evaporator chamber and said second solution mixing chamber, a second line communicating between said second evaporator chamber and said second solution mixing chamber, means for circulating solution from said second evaporator chamber to said second solution mixing chamber through said first line and back to said second evaporator chamber through said second line, means for separating vapor from solution in said second evaporator chamber and for removing separated vapor from said second evaporator chamber, means for directing solution from said first evaporator chamber to said second solution mixing chamber, means for directing solution from said second evaporator chamber to said salt removal means, a second heater chamber, means for directing solvent and solid salt commingled therewith from said container to said second heater chamber, means for directing solvent and solid salt commingled therewith from said second heater chamber to the aforesaid heater chamber, and means for directing vapor from said evaporator chamber into said second heater chamber and into direct contact with solvent within said second heater chamber.

13. In apparatus of the character described for treating a salt, the combination comprising a source of supply of a solution of said salt in a solvent therefor, an evaporator chamber, means for maintaining the pressure within said evaporator chamber at a pressure substantially lower than that prevailing in said source of supply of said solution, a solution mixing chamber, solution circulating means for circulating solution from said evaporator chamber directly to said solution mixing chamber with attendant rise in pressure and directly back to said evaporator chamber with attendant lowering of pressure, and means for directing solution from said source of supply into said solution mixing chamber for initial contact in said solution mixing chamber with solution in said solution circulating means.

14. Apparatus according to claim 13 which includes means for withdrawing a portion of the solution circulated in said solution circulating means and any crystallized salt contained therein at a point between said evaporator chamber and said mixing chamber.

15. Apparatus of the character described for treating a salt which comprises an evaporator chamber, salt-removing means adapted to remove salt from a salt-containing solution, means for directing salt containing solution from said evaporator chamber into said salt removing means, a heater chamber, means for directing residual solution from which salt has been removed by said salt-removing means from said salt-removing means into said heater chamber, means for feeding solid salt into said heater chamber and into direct contact with solution in said heater chamber, means for directing a vapor into said heater chamber and into direct contact with solution in said heater chamber, a saturator chamber, means for directing solution commingled with solid salt from said heater chamber into said saturator chamber, and means for directing solution from said saturator chamber into said evaporator chamber, said last-mentioned means comprising means for separating undissolved material from said solution directed from said saturator chamber into said evaporator chamber.

16. Apparatus of the character described for treating a salt which comprises an evaporator chamber, salt-removing means adapted to remove salt from a salt-containing solution, means for directing salt-containing solution from said evaporator chamber into said salt-removing means, a salt mixing vessel, means for directing residual solution from which salt has been removed in said salt-removing means into said salt-mixing vessel, means for feeding solid salt into said salt-mixing vessel, a heater chamber, a conduit adapted to direct solution and solid salt contained therein from said salt-mixing vessel into said heater chamber, a pump in said conduit adapted to impel said solution and salt contained therein from said mixing vessel into said heater chamber, means for supplying vapor and directing said vapor into said heater chamber in direct contact with solution in said heater chamber, a saturator chamber, means for directing solution and solid salt contained therein from said heater chamber into said saturator chamber, and means for directing solution from said saturator chamber into said evaporator chamber, said last-named means comprising means for separating insoluble material from solution directed from said saturator chamber into said evaporator chamber.

17. Apparatus according to claim 16 wherein said heater chamber is disposed substantially above said pump and which comprises a by-pass line for directing solution from said heater chamber into said conduit on the inlet side of said pump.

18. Apparatus of the character described which comprises a heater chamber, means for supplying vapor and for directing said vapor into said heater chamber in direct contact with solution therein, a saturator chamber, means for directing heated solution from said heater chamber into said saturator chamber, means for feeding solid salt into said saturator chamber in direct contact with solution therein, an evaporator chamber, conduit means for directing solution from said saturator chamber into said evaporator chamber, adjustable valve means for controlling the flow of solution through said conduit means from said saturator chamber into said evaporator chamber, means for separating undissolved material from solution directed from said saturator chamber into said evaporator chamber prior to its entry therein, means for withdrawing vapor from said evaporator chamber, salt-removing means adapted to remove salt from a salt-containing solution, means for directing salt-containing solution from said evaporator chamber to said salt-removing means, and means for directing residual solution from which salt has been removed in said salt-removing means from said salt-removing means into said heater chamber, said last-named means comprising conduit means adapted to direct solution from said salt-removing means into said heater chamber, a pump in said conduit means, and a by-pass line for directing heated solution from said heating chamber into said conduit means on the inlet side of said pump.

19. Apparatus of the character described for treating a salt which comprises an evaporator chamber having an inlet and an outlet for introducing salt solution into and removing residual salt solution from said evaporator chamber respectively, means for controlling the amount of salt solution removed from said evaporator chamber through said outlet responsive to liquid level within said evaporator chamber for maintaining the level of solution within said evaporator chamber substantially constant regardless of the rate of introduction of salt solution into said evaporator chamber through said inlet, salt removing means adapted to remove salt from a salt-containing solution, means for directing salt-containing solution from said outlet into said salt removing means, a heater, a saturator chamber, a filter, means for directing salt solution from said saturator chamber to said filter and from said filter into said inlet of said evaporator chamber including a valve for controlling the rate of flow of solution entering said evaporator chamber through said inlet, and means for directing salt solution from said salt-removing means into said heater and from said heater into said saturator chamber including a pump, and means responsive to the rate of flow established by said valve for controlling the rate of flow solution entering said saturator.

20. Apparatus of the character described for treating a salt which comprises a first evaporator, a second evaporator, means for directing a salt-containing solution from said first evaporator into said second evaporator, salt-removing means adapted to remove salt from a salt-containing solution, means for directing salt-containing solution from said second evaporator into said salt-removing means, a first heater chamber, means for directing solution from said salt-removing means after removal of salt therefrom into said first heater chamber, means for directing vapor evolved from solution in said first evaporator from said first evaporator into said first heater chamber and into direct contact with solution in said first heater chamber, a second heater chamber, means for directing solution from said first heater chamber into said second heater chamber, a vapor supply source adapted to supply vapor under pressure substantially higher than the prevailing pressure of vapor in said first evaporator, means for directing vapor from said source to said second heater chamber and into direct contact with solution in said second heater chamber, a saturator chamber, means for directing heated solution from said second heater chamber into said saturator chamber, means for feeding solid impure salt into said saturator chamber for direct contact with solution therein, means for directing solution from said saturator chamber into said first evaporator, and means for separating undissolved material directed from said saturator chamber into said first evaporator prior to its entry into said first evaporator.

21. Apparatus according to claim 20 wherein said means for directing vapor from said vapor supply source into said second heater chamber includes a jet compressor, and which comprises means for directing vapor evolved from solution in said first evaporator into said jet compressor for entrainment with vapor passing through said jet compressor in being directed from said vapor supply source into said second heater chamber.

22. Apparatus of the character described for treating a salt which comprises evaporator means, salt-removing means adapted to remove salt from a salt-containing solution, means for directing salt-containing solution from said evaporator means into said salt-removing means, heating means adapted to heat a salt solution by direct contact with vapor, means for directing residual salt solution from said salt-removing means to said heating means, means for directing a portion of the vapor evolved from said solution in said evaporator means into said heating means into direct contact with solution therein, a source of supply of vapor at a pressure substantially greater than the pressure of vapor evolved in said evaporator means, means for directing vapor from said source into said heating means in direct contact with solution in said heating means, a condenser, means for directing another portion of vapor evolved from solution in said evaporator means from said evaporator means into said condenser for condensation therein, means for directing condensate resulting from condensation of the vapor directed into said condenser from said evaporator means out of the system, a saturator chamber, means for directing solution from said heating means into said saturator chamber, means for feeding solid impure salt into said saturator chamber in contact with solution contained therein, means for directing solution from said saturator chamber into said evaporator means, and means for removing undissolved material from solution directed from said saturator means into said evaporator means prior to its entry into said evaporator means.

23. Apparatus according to claim 22 wherein said means for directing a portion of the vapor evolved from solution in said evaporator means from said evaporator means into said heating means includes means for compressing said portion of said vapor to a pressure substantially greater than that prevailing in said evaporator means prior to contact of said vapor with solution in said heating means.

24. Apparatus of the character described for treating a salt which comprises an evaporator adapted for separation of vapor from a salt solution, salt-removing means adapted to remove salt from a salt-containing solution, means for directing salt-containing solution from said evaporator into said salt-removing means, a heater adapted to heat a salt solution by direct contact with a vapor, means for directing salt solution from said salt-removing means to said heater, means for supplying vapor and for directing said vapor into said heater for condensation in direct contact with salt solution therein, a saturator chamber, means for directing heated solution from said heater to said saturator chamber, means for measuring the quantity of undissolved salt in said saturator chamber, means for supplying solid inpure salt to said saturator chamber including variable speed mechanical feeding means for feeding solid salt so as to maintain the quantity of solid salt in said saturator chamber substantially constant, means for directing salt solution from said saturator chamber into said evaporator, and means for separating undissolved material from salt solution directed from said saturator chamber into said evaporator.

25. Apparatus of the character described for treating sodium chloride which comprises a container for sodium chloride solution chlorine stripping means, means for directing sodium chloride solution from said container into said chlorine stripping means, a salt mixing vessel, means for directing solution from said chlorine stripping means into said vessel, means for feeding solid sodium chloride into said salt mixing vessel, a heater chamber, means for directing solution commingled with solid sodium chloride from said salt mixing vessel into said heater chamber, means for supplying a vapor and for directing said vapor into said heater chamber in direct contact with solution contained therein, a saturator chamber, means for directing solution commingled with solid sodium chloride from said heater chamber to said saturator chamber, an evaporator, means for directing solution from said saturator chamber into said evaporator, means for removing undissolved material from solution directed from said saturator chamber into said evaporator, and means for directing salt-containing solution from said evaporator to said container.

26. Apparatus according to claim 25 which comprises by-pass means adapted and arranged to direct solution from said container and feed it into solution contained in said means for directing salt-containing solution from said evaporator into said container for admixture therewith prior to entry into said container.

References Cited in the file of this patent
UNITED STATES PATENTS

| Number | Name | Date |
|---|---|---|
| 912,339 | Wentworth et al. | Feb. 16, 1909 |
| 959,730 | Gabriel | May 31, 1910 |
| 1,751,740 | Jeremiassen | Mar. 25, 1930 |
| 1,860,741 | Jeremiassen | May 31, 1932 |
| 1,961,160 | Moulton | June 5, 1934 |
| 2,555,340 | Hopper | June 5, 1951 |
| 2,753,242 | Davis | July 3, 1956 |